US008991701B2

(12) United States Patent
Bolton et al.

(10) Patent No.: US 8,991,701 B2

(45) Date of Patent: Mar. 31, 2015

(54) INTEGRATED VOTING SYSTEM AND METHOD FOR ACCOMMODATING PAPER BALLOTS AND AUDIO BALLOTS

(71) Applicants: Steve Bolton, Clearwater, FL (US); Tim Cordes, La Vista, NE (US); Herman Deutsch, Buffalo Grove, IL (US)

(72) Inventors: Steve Bolton, Clearwater, FL (US); Tim Cordes, La Vista, NE (US); Herman Deutsch, Buffalo Grove, IL (US)

(73) Assignee: Election Systems & Software, LLC, Omaha, NE (US)

( * ) Notice: Subject to any disclaimer, the term of this patent is extended or adjusted under 35 U.S.C. 154(b) by 0 days.

(21) Appl. No.: 13/887,817

(22) Filed: May 6, 2013

(65) Prior Publication Data

US 2013/0248599 A1 Sep. 26, 2013

Related U.S. Application Data

(63) Continuation of application No. 12/049,210, filed on Mar. 14, 2008, now Pat. No. 8,733,646.

(60) Provisional application No. 60/918,117, filed on Mar. 15, 2007.

(51) Int. Cl.
*G06K 17/00* (2006.01)
*G07C 13/00* (2006.01)

(52) U.S. Cl.
CPC .................................... *G07C 13/00* (2013.01)
USPC ........................................................ 235/386

(58) Field of Classification Search
CPC ...................................................... G07C 13/00
USPC ............................................ 235/386; 94/386
See application file for complete search history.

(56) References Cited

U.S. PATENT DOCUMENTS

| | | | |
|---|---|---|---|
| 3,793,505 | A | 2/1974 | McKay et al. |
| 4,066,871 | A | 1/1978 | Cason, Sr. et al. |
| 4,142,095 | A | 2/1979 | Cason, Sr. et al. |

(Continued)

FOREIGN PATENT DOCUMENTS

| | | |
|---|---|---|
| WO | WO/03/071491 | 8/2003 |
| WO | WO/2008/113058 | 9/2008 |

OTHER PUBLICATIONS

*Voluntary Voting System Guidelines*, adopted by the Election Assistance Commission (EAC) on Dec. 13, 2005 (vol. I and II) 190 pgs.

*Primary Examiner* — Christopher Stanford
(74) *Attorney, Agent, or Firm* — Stinson Leonard Street LLP

(57) ABSTRACT

A voting system includes an accessible voting station and a tabulation device. The accessible voting station presents an audio ballot to a voter and receives one or more voting selections entered in response to the audio ballot from the voter. The accessible voting station also prints a ballot that includes the entered voting selections and scans at least a portion of the ballot to determine the voting selections printed thereon. The accessible voting station further presents an audio representation of the scanned voting selections to the voter and receives a confirmation of the audio representation of the scanned voting selections from the voter. The tabulation device tabulates the voting selections printed on the ballot by scanning the printed ballot or receiving voting selection information extracted from the printed ballot from the accessible voting station.

57 Claims, 33 Drawing Sheets

(56) References Cited

U.S. PATENT DOCUMENTS

| | | | |
|---|---|---|---|
| 4,510,378 | A | 4/1985 | Dolson |
| D282,375 | S | 1/1986 | Dolson |
| 5,821,508 | A | 10/1998 | Willard |
| 6,824,053 | B2 | 11/2004 | Bluemer |
| 7,128,263 | B1 | 10/2006 | Nguyen et al. |
| 7,210,617 | B2 | 5/2007 | Chaum |
| 7,516,891 | B2 | 4/2009 | Chaum |
| 8,136,729 | B2 | 3/2012 | Bolton |
| 8,162,215 | B2 | 4/2012 | Chaum |
| 8,191,764 | B2 | 6/2012 | Bolton |
| 8,195,505 | B2 | 6/2012 | Poulos et al. |
| 2002/0106620 | A1 | 8/2002 | Barnum |
| 2002/0107724 | A1 | 8/2002 | Openshaw, II et al. |
| 2003/0121975 | A1 | 7/2003 | Bluemer |
| 2003/0158775 | A1 | 8/2003 | Chaum |
| 2004/0238632 | A1* | 12/2004 | Homewood et al. .......... 235/386 |
| 2005/0161507 | A1 | 7/2005 | Openshaw, II et al. |
| 2005/0247783 | A1* | 11/2005 | Poulos et al. ................. 235/386 |
| 2006/0041468 | A1* | 2/2006 | Reardon ......................... 705/12 |
| 2007/0095909 | A1 | 5/2007 | Chaum |
| 2007/0267493 | A1 | 11/2007 | Coutts |
| 2008/0272194 | A1 | 11/2008 | Chaum |
| 2008/0308633 | A1 | 12/2008 | Bolton et al. |
| 2008/0308634 | A1 | 12/2008 | Bolton et al. |
| 2009/0256703 | A1 | 10/2009 | Bolton |
| 2010/0145774 | A1 | 6/2010 | Veshnyakov et al. |
| 2010/0230491 | A1 | 9/2010 | Bolton |
| 2011/0145150 | A1 | 6/2011 | Onischuk |
| 2012/0232963 | A1 | 9/2012 | Poulos et al. |
| 2012/0259680 | A1 | 10/2012 | Poulos et al. |
| 2012/0259681 | A1 | 10/2012 | Poulos et al. |
| 2013/0248599 | A1 | 9/2013 | Bolton et al. |
| 2013/0301873 | A1 | 11/2013 | Hoover et al. |

* cited by examiner

FIG. 9G
2008 General Election
Oklahoma County, OK
November 4, 2008
Precinct: Central High School
Public Count: 3
Audio Ballot Selection:
Political Party
Instructions:
Select a Political Party
and press "Next".
6 Available Political Parties
Democratic
Republican
Independance
Consrvative
Socailist Workers
Page 1 of 2
Back
Next

INTEGRATED VOTING SYSTEM AND METHOD FOR ACCOMMODATING PAPER BALLOTS AND AUDIO BALLOTS

CROSS-REFERENCE TO RELATED APPLICATIONS

This application is a continuation of and claims priority to U.S. patent application Ser. No. 12/049,210, filed on Mar. 14, 2008, which is based on and claims priority to U.S. Provisional Application Ser. No. 60/918,117, filed on Mar. 15, 2007, each of which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to voting systems and, more particularly, to an integrated voting system and method for accommodating paper ballots and audio ballots.

2. Description of Related Art

A variety of different types of voting equipment are used in the United States and throughout the world. In many jurisdictions, a voter receives a traditional paper ballot on which is printed the various races to be voted on. The voter votes by darkening or otherwise marking the appropriate mark spaces on the paper ballot. The marked paper ballot may then be dropped in a ballot box, whereby the ballot is transferred to a centralized location for tabulation by a central ballot counter. Alternatively, many jurisdictions provide a precinct ballot counter at the polling place in order to expedite the tabulation of votes.

In jurisdictions that use traditional paper ballots, an electronic ballot marking device may be provided for use by voters who are blind, vision-impaired, or have a disability or condition that would make it difficult or impossible to manually mark a paper ballot in the usual way. In operation, a voter receives a paper ballot from a poll worker and takes the paper ballot to the ballot marking device. The voter inserts the paper ballot into the device, whereby the paper ballot is scanned and the various races to be voted on are presented to the voter either visually on a touch screen display or audibly via headphones. The voter then selects his/her votes using one of several different types of input devices (e.g., a touch screen display, Braille-embossed keys, etc.). Once the voter confirms that the selected votes are correct, a printer marks the paper ballot by printing marks in the appropriate mark spaces on the paper ballot. The voter or a poll worker then drops the marked paper ballot in a ballot box for tabulation by a central ballot counter or, if available, inserts the marked paper ballot into a precinct ballot counter.

In recent years, many jurisdictions have turned to electronic voting machines (such as direct recording electronic (DRE) voting machines) in lieu of traditional paper ballots. Typically, an electronic voting machine includes a touch screen display for displaying the various races to be voted on and allowing the "touch" selection of votes. Once the voter confirms that the selected votes are correct, the voting selections are recorded in the memory of the voting machine and electronically tabulated with the voting selections of other voters. The electronic voting machine may also include an audio ballot function for use by voters who are blind or vision-impaired.

One issue that has been raised with respect to electronic voting machines is that there is no paper record of the voter's selection of votes. As such, many voters are skeptical of the integrity of the election process and believe that their electronic votes may not be counted correctly. In an attempt to resolve this issue, many jurisdictions require that the electronic voting machine provide a voter-verifiable paper record of votes cast on the voting machine. For example, the paper record may comprise a plurality of voting records each of which corresponds to a voting session of a voter. Each voter is able to review his/her voting record and verify that the electronic votes have been recorded and tabulated correctly. The paper record can then be compared to the electronic records and vote tallies of the voting machine for auditing purposes.

BRIEF SUMMARY OF THE INVENTION

The present invention is directed to an integrated voting system and method for accommodating both paper ballots and audio ballots. While some voters may vote by marking a paper ballot and feeding the marked ballot into a voting device, other voters may choose to vote via an audio ballot at an accessible voting station in communication with the voting device. Preferably, the voting device is capable of executing the paper ballot mode and the audio ballot mode concurrently. Thus, the integrated voting system may be used in place of several different types of voting equipment, including an electronic ballot marking device, a precinct ballot counter and/or a central ballot counter.

In an exemplary embodiment, a voter may choose to vote by manually marking his/her voting selections on a paper ballot. The voter then places the marked paper ballot in a ballot insertion tray of the voting device. Upon insertion, a scanner assembly scans the paper ballot and a processing circuit decodes the marked voting selections. Preferably, any irregularities associated with the paper ballot (e.g., an undervote and/or an overvote) are identified and displayed to the voter on a touch screen display so that the voter may correct the irregularities if desired. Finally, a processing circuit tabulates the marked voting selections.

Alternatively, a voter who is blind or vision-impaired may choose to vote with an audio ballot. In this case, a poll worker activates the audio ballot through the touch screen display of the voting device. The various races to be voted on are then read to the voter through headphones, whereby the voter selects his/her votes through an ADA voting console. After the voting selections have been made, a ballot printer prints a ballot that includes a description of each contest in conjunction with the name of the selection and an associated barcode. A barcode reader is used to read the printed barcodes on the ballot, and the information encoded in the barcodes is read to the voter through the headphones so that the voter can verify that the printed voting selections are correct. The printed ballot is then dropped into a ballot bin. A poll worker subsequently collects the printed ballot from the ballot bin (along with other ballots) and inserts the printed ballot into the voting device for tabulation. Alternatively, the processing circuit of the voting device may electronically tabulate the printed voting selections that were read by the bar code reader and verified by the voter.

DETAILED DESCRIPTION OF EXEMPLARY EMBODIMENT

The present invention is directed to an integrated voting system and method for accommodating both paper ballots and audio ballots. While the invention will be described in detail below with reference to an exemplary embodiment, it should be understood that the invention is not limited to the specific system configuration or methodology of this embodiment. In addition, although the exemplary embodiment is described as embodying several different inventive features, one skilled in the art will appreciate that any one of these features could be implemented without the others in accordance with the invention.

Exemplary Configuration of Voting System

Figure 1:
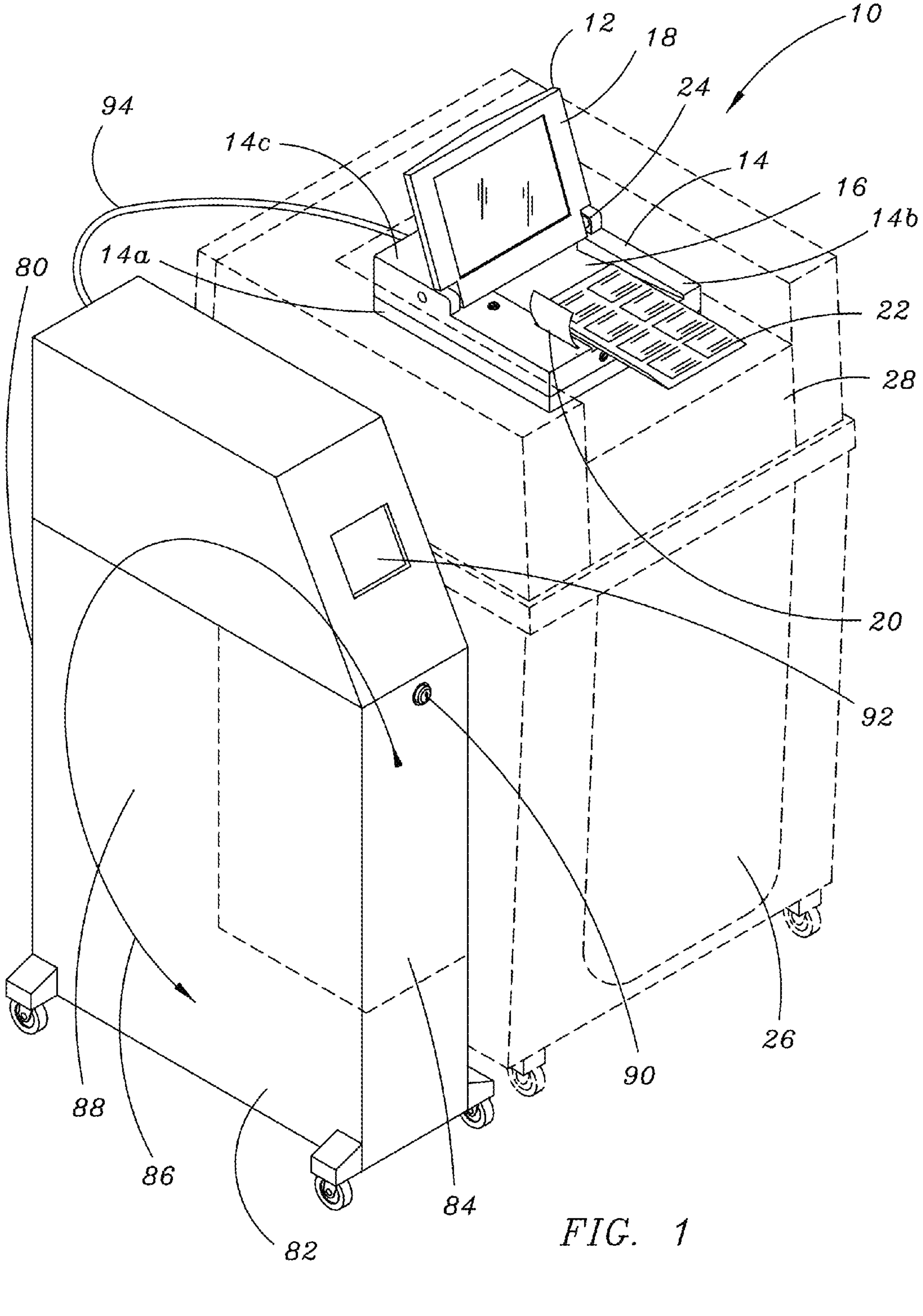
FIG. 1 is a perspective view of an exemplary embodiment of a voting system in accordance with the present invention.

Referring to FIG. 1, an exemplary embodiment of a voting system in accordance with the present invention is shown as reference numeral 10. Voting system 10 comprises a voting device 12 that generally includes a protective housing 14 with various internal components (as described in detail with reference to FIG. 2), a ballot insertion tray 16, a display 18 and a report printer 20. Each of these components will be described in detail below.

Protective housing 14 is preferably made of injection-molded plastic and has a modular "clamshell" design that provides easy access for maintenance and set up activities. Of course, other materials and designs are also within the scope of the present invention. Protective housing 14 preferably comprises three primary sections to assist in ease of manufacturing and maintenance: base section 14*a*, front cover section 14*b*, and rear cover section 14*c*. In addition, various access doors (not shown) may be included to provide access to a variety of switches, connections and interfaces. For example, in the exemplary embodiment, a locked access door is provided to secure access to a power switch, a "close polls" switch, and a modem with an RJ-11 connection and antenna (discussed further in connection with the main access board 66 of FIG. 2). Another locked access door is provided to secure access to various USB port interfaces for removable USB flash drives (discussed further in connection with the USB board 64 of FIG. 2).

The back of protective housing 14 preferably includes a variety of external ports (not shown), such as a USB hub 70 (FIG. 2) and other types of ports that are standard and well known in the art. The back of protective housing 14 also preferably includes a personalized electronic ballot (PEB) reader/writer (discussed further in connection with the PEB board 68 of FIG. 2). Of course, the external ports and PEB reader/writer may be located in other locations provided they do not interfere with the use of the voting device 12.

The ballot insertion tray 16 is provided to receive a paper ballot for scanning and tabulation. The ballot insertion tray 16 is preferably molded into the front cover section 14*b* of protective housing 14 and is approximately 8.525 inches wide in order to accommodate an 8.5 inch wide standard-size ballot, such as ballot 22 shown in FIG. 1. The ballot insertion tray 16 can, however, be designed to fit any size ballot. An additional tray insert (not shown) having reversible paper guides may be mounted into the ballot insertion tray 16. For example, when the paper guides are oriented down, the ballot insertion tray 16 may accommodate an 8.5 inch wide ballot. When the paper guides are oriented up, a 4.25 inch wide ballot may be supported. An arrow graphic is also preferably molded onto the ballot insertion tray 16 or additional tray insert to indicate the proper insertion of the ballot. Lastly, the ballot insertion tray 16 preferably has a ribbed texture to assist with reducing static buildup.

The display 18 is preferably an LCD touch screen display with a landscape orientation. The display 18 may be a standard, off-the-shelf component which is readily available and well known in the art. For example, the display 18 may be a standard size of 10.4 inches or 12.1 inches, measured diagonally, and approximately 82×82 dpi. Most preferably, the display 18 is an LG Philips 12.1" SVGA (800×600) TFT color display model LB121S03-TL01, which has a color depth of LVDS 6-bit, 262,144 colors and an anti-glare surface treatment. Of course, other types of touch screen displays may also be utilized in accordance with the present invention.

The display 18 is connected to the upper portion of voting device 12 by two hinges 24—one located on each side of the display 18—which enable the display 18 to open up during use or fold down flat during storage. For security and protection, the display 18 preferably incorporates a locking mechanism. The voting device 12 may include an LCD switch 72 (FIG. 2) that will sense that the display 18 is open to thereby power up without necessitating a poll worker physically turning on the display 18. Similarly, the LCD switch 72 will sense that the display 18 is closed to thereby power down after a specified period of time.

Alternatively, if the display 18 is not configured as a touch screen display, the voting device 12 would also include another type of input device, such as a keyboard, a joystick, a pointing device, a trackball or a touch pad. The display 18 may also comprise a cathode ray tube (CRT) display configured as a touch screen display located external to the voting device 12. In such a configuration, the display would be connected to the voting device 12 through a dedicated I/O connector of the voting device 12. Of course, other types of displays and input devices are also possible and within the scope of the present invention.

As will be described in greater detail below, the display 18 provides an improved voter interface that may be used to display information associated with a scanned paper ballot to the voter (e.g., information on ballot irregularities) and receive voter feedback. The display 18 may also be used to present an electronic ballot to the voter, whereby the voter may vote by touching the appropriate locations on the display 18 with either a finger or a computer pen (not shown).

The report printer 20 is an internal printer for device level and polling place level reporting, including the printing of reports at poll opening and poll closing (as are known in the art). The report printer 20 is a standard printer that is readily available and well known to those skilled in the art. The report printer 20 is capable of printing on paper that is approximately 3 inches wide and is of the drop-in roll paper type. As shown in FIG. 1, the paper passes through an aperture in the protective housing 14 such that it is easily accessible by users.

As shown in FIG. 1, voting device 12 mounts onto the top of a ballot receptacle 26. The base of voting device 12 includes four mounting feet (not shown) that provide airflow under the unit and allow it to be securely inserted into a recessed area of the ballot receptacle 26. In this embodiment, voting device 12 slides onto mounting rails (not shown) located on top of the ballot receptacle 26. A hinged door (not shown) may be located on the front of the ballot receptacle 26 and may be raised up and locked into place to further secure the voting device 12. The ballot receptacle 26 is preferably made of steel or a durable plastic material for security purposes. In operation, scanned and tabulated ballots are deposited directly into the ballot receptacle 26. In addition, the ballot receptacle 26 preferably includes a compartment 28 that poll workers can use to temporarily store uncounted ballots in the event of a power failure, scanner error, or the like. Of course, the ballot receptacle 26 may have other configurations as are well known to those skilled in the art.

Figure 2:
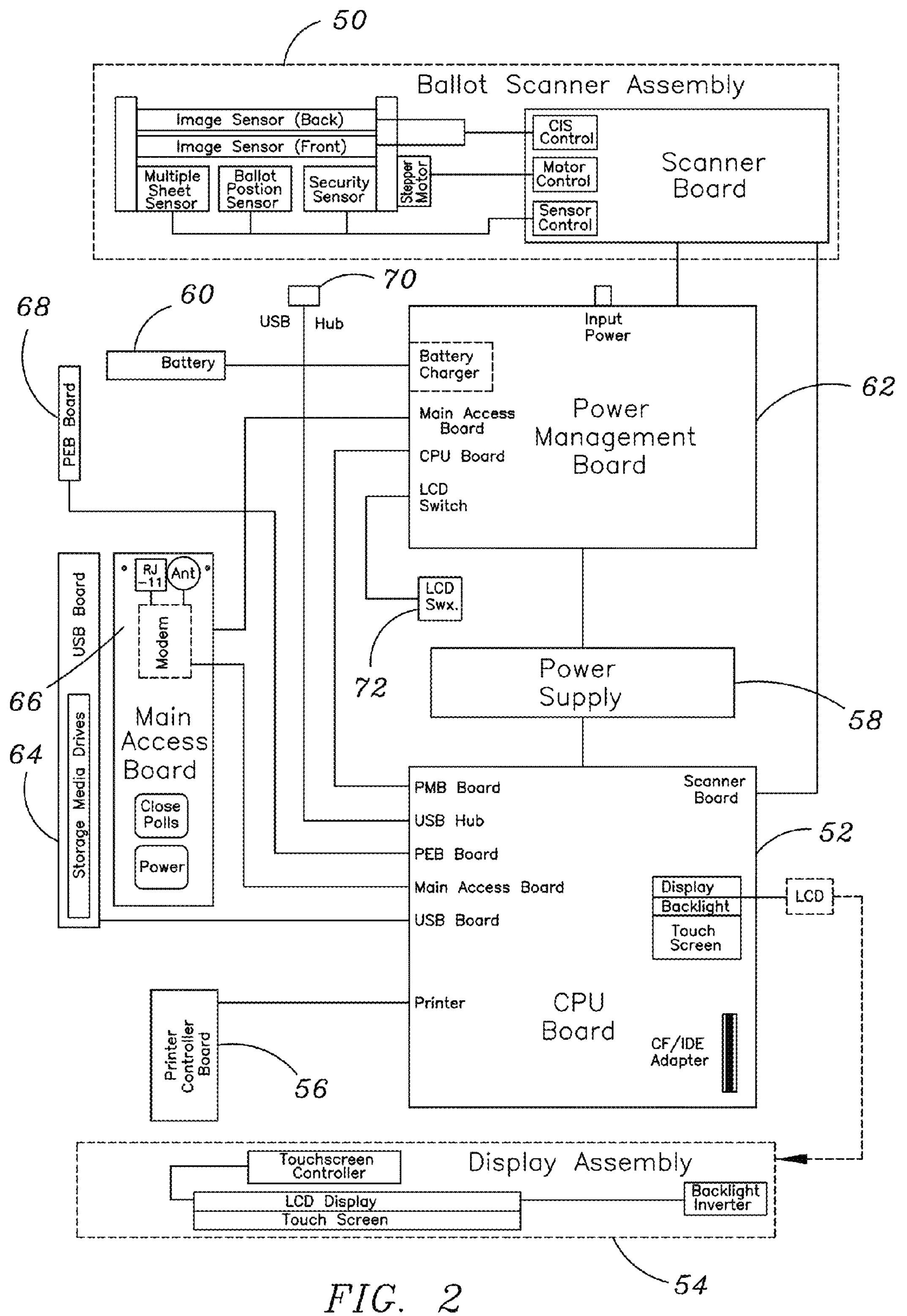
FIG. 2 is a block diagram of the various internal components of the voting device of FIG. 1.

Turning to FIG. 2, the internal components of voting device 12 are shown in a block diagram format and generally include: a ballot scanner assembly 50, a CPU board 52, a display assembly 54, a printer controller board 56, an internal power supply 58, an internal battery pack 60, a power management board 62, a USB board 64, a main access board 66, a PEB board 68, a USB hub 70, and an LCD switch 72 (discussed above). It should be understood that the various components and subsystems are connected to each other as shown in FIG. 2.

The ballot scanner assembly 50 includes a scanner board that provides the image capture, processing and transport control functions associated with scanning a paper ballot. The ballot scanner assembly 50 utilizes a set of sensors to monitor each paper ballot as it is placed in the ballot insertion tray 16 of voting device 12 and travels through the ballot transport mechanism (not shown). These sensors detect the position of the ballot, check for multiple ballots and confirm the release of the ballot into the ballot receptacle 26. There may also be a security sensor that detects counterfeit ballots and ballots that have been tampered with. The ballot scanner assembly 50 utilizes two contact image sensors to produce a bitmap image of the paper ballot (preferably at 200 dpi or greater). One contact image sensor is positioned to read the top surface of the ballot and the other contact image sensor is positioned to read the bottom surface of the ballot. The imaging of the top and bottom surfaces of the ballot preferably occurs simultaneously. The paper ballot is pulled across the contact image sensors to capture the ballot image. In this embodiment, the ballot scanner assembly 50 utilizes image capture technology available from Ricoh Electronics, Inc. The ballot image captured by the ballot scanner assembly 50 is passed to the CPU board 52, which decodes and tabulates the voting selections marked on the scanned ballot (described further below).

The CPU board 52 is a commercial off-the-shelf board that generally controls the operation of voting device 12 for all three modes of operation: the paper ballot mode, the electronic ballot mode and the audio ballot mode (described in greater detail below). The CPU board 52 is preferably capable of executing at least two independent processes concurrently so that either the paper ballot mode or the electronic ballot mode may be executed concurrently with the audio ballot mode. Accordingly, it is preferable to use an operating system that includes multi-tasking functionality, such as Linux and other operating systems known in the art. In this embodiment, the CPU board 52 is a VIA Embedded Platform EPIA-CL with a VIA C3™ or VIA Eden™ ESP processor. The CPU board 52 may include any type of memory that is suitable for storing information necessary for the operation of voting device 12, as is well known in the art.

Many of the other internal components of voting device 12 are also well known in the art. For example, the display assembly 54 includes an LCD display touch screen, a backlight inverter and a touch screen controller that provides an interface to display 18. The printer controller board 56 provides an interface to the report printer 20. In addition, the USB hub 70 provides a plurality of external USB ports that provide a connection for a variety of external devices, including an audit log printer assembly 80 (described below in connection with FIG. 1) and a voting console 104 with associated ballot printer/reader assembly 108 (described below in connection with FIGS. 3 and 4).

The USB board 64 includes a plurality of external USB port interfaces that accommodate removable USB flash drives or any other type of removable data storage system. The removable USB flash drives may be used to store the election definition and the accumulated vote totals for voting device 12. Also, the removable USB flash drives may be used to store the images of the scanned ballots, which may be accessed at a later time for audit purposes (applicable in the paper ballot mode of operation, described below). The removable USB flash drives may further be used to store a back-up copy of an electronic audit log, which may be removed after the election for transport to election headquarters (applicable in the electronic ballot mode of operation, described below).

The PEB board 68 provides an interface to a PEB reader/writer for reading information from and writing information to various PEBs, such as a master PEB, a supervisor PEB and/or a voter PEB (applicable in the electronic ballot mode of operation, described below). The configuration of the PEB reader/writer is described in greater detail in U.S. Pat. No. 5,583,329 assigned to the assignee of the present application, which is incorporated herein by reference in its entirety.

The main access board 66 includes a power switch and a "close polls" switch. The main access board 66 also includes a modem with an RJ-11 connector and antenna, which provide both landline and wireless modem options for transmitting vote results to a central vote accumulation site.

The voting device 12 is powered by a power management subsystem that includes the power management board 62, an internal battery pack 60, and an internal ITX power supply 58. The power management board 62 is a custom power supply board which receives its input from an external brick power supply that operates on standard AC-volt lines. The internal battery pack 60 (preferably a re-chargeable Lithium-Ion type) provides up to two hours of operation during a loss of AC power. The internal ITX power supply 58 provides power to the CPU board 52, as is known in the art. The power management board 62 monitors the status of and charges the internal battery pack 60, and automatically switches from the external brick power supply to the internal battery pack 60 as needed.

Referring back to FIG. 1, voting system 10 includes an audit log printer assembly 80 located external to voting device 12 that is operable to print an audit log of the voter actions and/or poll worker actions taken at the voting device 12 during the electronic ballot mode of operation (described below). In the exemplary embodiment, the audit log printer assembly 80 includes a printer (not shown) that is operable to print the voter actions and/or poll worker actions on a printable medium, such as a continuous paper roll or folded sheets of paper stock, to create the audit log. Preferably, the audit log is printed in real-time as the voter actions and/or poll worker actions are taken at the voting device 12.

The printable medium is secured within a locked housing 82 such that the printable medium is inaccessible to a voter using the voting system 10. Specifically, the printable medium is stored within a supply compartment 84 prior to printing and, during printing, the audit log is transported along a paper transport path 86 to a storage bin 88. Of course, poll workers would have access to locked housing 82 via a lock 90 in order to load the printable medium, unload the audit log, clear any paper jams, etc. Preferably, locked housing 82 includes a display window 92 that enables a voter to review a portion of the audit log associated with the voter in order to verify the correctness of the voter actions printed on the printable medium. A magnifier may optionally be provided to assist the voter in reviewing the audit log. As such, the printed audit log may be used for both auditing purposes and voter verification.

The audit log printer assembly 80 is connected to the voting device 12 via a USB cable 94 (which connects to one of the USB ports of USB hub 70). While audit log printer assembly 80 is located external to voting device 12 in the exemplary embodiment, it should be understood that audit log printer assembly 80 could also be included as part of voting device 12 or mounted in another location. Of course, one skilled in the art will appreciate that other configurations for audit log printer assembly 80 are within the scope of the present invention.

Figure 3:
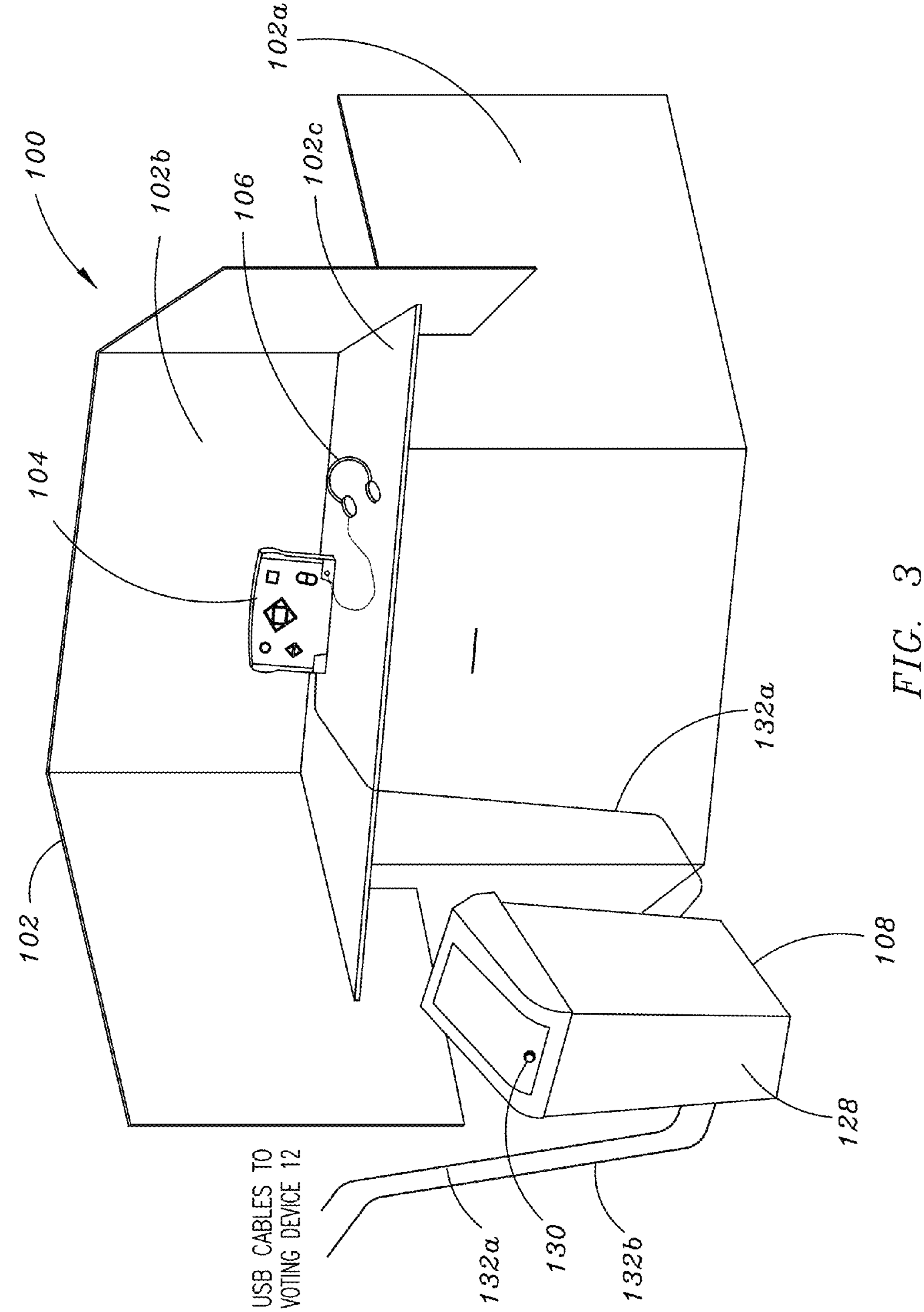
FIG. 3 is a perspective view of an exemplary embodiment of an accessible voting station used in connection with the voting system of FIG. 1.
Figure 4:
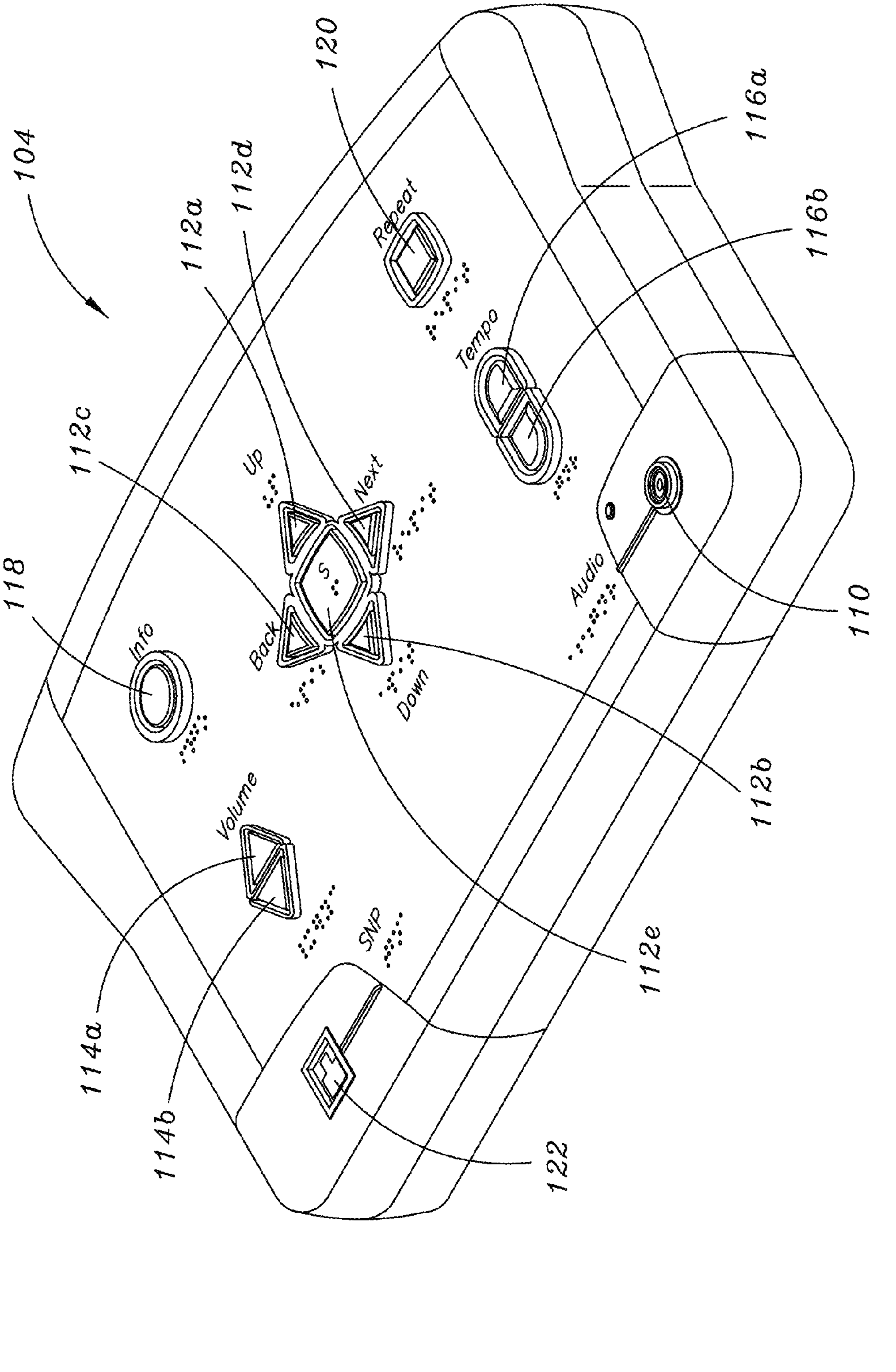
FIG. 4 is a perspective view of the voting console of FIG. 3.

Referring to FIGS. 3 and 4, voting system 10 further includes an accessible voting station 100 that allows voters with disabilities to vote independently when the voting device 12 is operating in the audio ballot mode (described below). The accessible voting station 100 generally includes a privacy screen 102, a voting console 104 with associated headphones 106, and a ballot printer/reader assembly 108. Preferably, the accessible voting station 100 complies with the requirements of the Americans with Disabilities Act (ADA), and the 2002 and 2005 voluntary voting system guidelines (VVSG).

The privacy screen 102 includes a lower wall section 102*a* that interlocks with an upper wall section 102*b* to form a standing voting booth. A tabletop section 102*c* slides into and is supported by the lower and upper wall sections 102*a* and 102*b*, thereby forming a shelf surface to support the voting console 104. The lower wall section 102*a*, upper wall section 102*b* and tabletop section 102*c* are preferably formed of plastic, corrugated plastic or any other suitable material. It can be appreciated that the privacy screen 102 may be easily assembled and disassembled by a poll worker and may be folded into a relatively flat configuration for transport and/or storage.

An exemplary embodiment of the voting console 104 is shown in FIG. 4. The voting console 104 includes an audio connection 110 for headphones 106. As will be described in greater detail below, a voter may use the voting console 104 and headphones 106 to navigate through an audio representation of the ballot. Specifically, the voter navigates through the audio ballot using the "up" 112*a*, "down" 112*b*, "back" 112*c* and "next" 112*d* buttons on the voting console 104 and selects his/her votes using the center "select" button 112*e*. The voter also has the ability to control the audio volume through the use of the "volume" up and down buttons 114*a*, 114*b* and the rate of speech through the use of the "tempo" up and down buttons 116*a*, 116*b*. The voting console 104 also has an "information" button 118 that provides instructions at any time during the voting session. A voter may also press a "repeat" button 120 to have the instructions or audio ballot presentation repeated. It can be appreciated that voters who are blind or vision-impaired would use the Braille markings on the voting console 104 to select the appropriate button. Finally, a connection port 122 is provided to accommodate other types of input devices, such as a sip and puff straw, large paddles, and any one of numerous other accessible devices that are known in the art. The connected input device would act as a mouse-type controller to operate the buttons on the voting console 104.

Referring back to FIG. 3, the ballot printer/reader assembly 108 includes a printer (not shown) operable to print a ballot that identifies the voting selections entered by the voter using the voting console 104. Preferably, the printed ballot includes a description of each contest, the name of the selected candidate for each contest and an associated barcode for each contest. The printed ballot may also include information on any under voted contests. It should be understood that all of the information printed on the ballot is human-readable except for the barcodes, which are printed in a machine-readable format. Of course, other ballot configurations are also within the scope of the present invention. The ballot printer/reader assembly 108 also includes a barcode reader (not shown) operable to read the barcodes printed on the ballot. It can be appreciated that the barcode reader is preferably located in proximity to the ballot printer in order to effectively read the barcodes printed on the ballot.

The ballot printer and barcode reader are securely mounted within a locked ballot bin 128 to prevent voter access to the printed ballots collected therein. The ballot bin 128 is preferably made of steel or a durable plastic material for security purposes, although other materials would also be acceptable. Poll workers would have access to ballot bin 128 via a lock 130 in order to load paper stock, remove the printed ballots, clear any paper jams, etc. In this embodiment, the voter is not able to review the printed ballot collected within the ballot bin 128. Of course, one skilled in the art will appreciate that other configurations in which the voter is given the opportunity to review the printed ballot are also within the scope of the present invention.

Preferably, the processing resources needed for the operation of the voting console 104 and ballot printer/reader assembly 108 are provided by the CPU board 52 of the voting device 12. As such, the voting console 104 and ballot printer/reader assembly 108 are connected to the voting device 12 via USB cables 132*a* and 132*b*, respectively (which connect to two of the USB ports of USB hub 70). Of course, other system configurations are also within the scope of the present invention.

Exemplary Operation of Voting System

An exemplary operation of the voting system 10 will now be described. First, a poll worker opens the poll by depressing the "power" switch located on the main access board 66 of voting device 12 and transferring the election definition data for a particular voting precinct to the voting device 12. The transfer of the election definition data may be effectuated by a variety of different means. For example, a removable USB flash drive may be inserted into one of the USB ports of USB board 64. Alternatively, a master PEB may be inserted into the PEB reader/writer of PEB board 68. Of course, other means are also within the scope of the present invention.

Figure 10A:
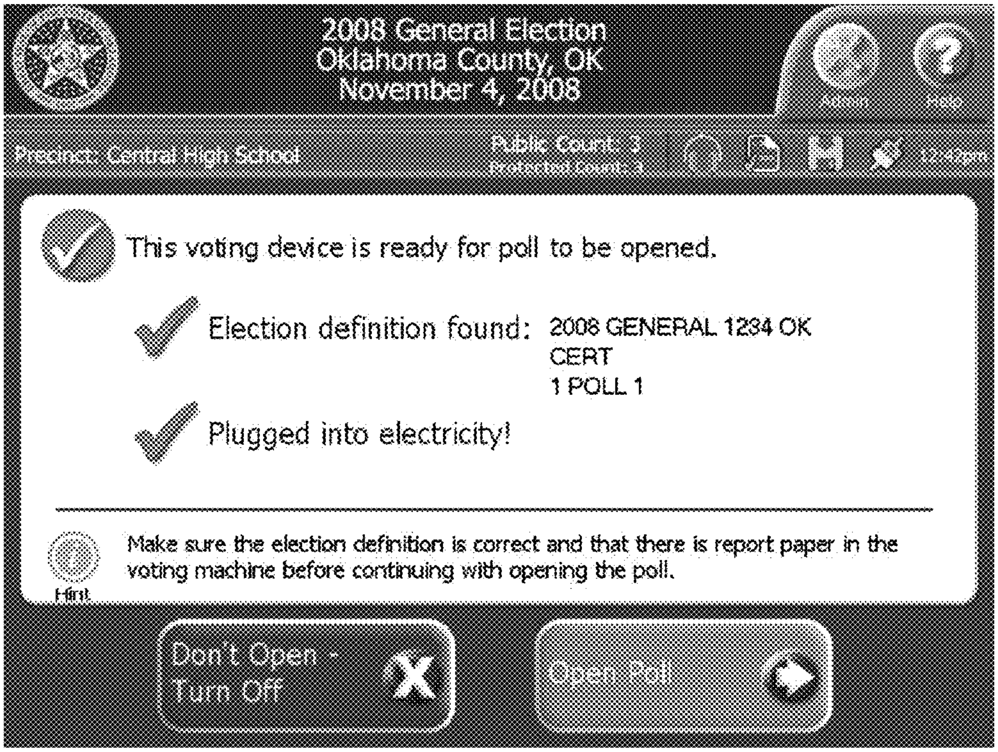
FIGS. 10A-10D are various screen shots of the display of the voting device of FIG. 1 when opening and closing a poll.

Next, voting device 12 displays a "voting device ready" screen on display 18 as shown in FIG. 10A. The "voting device ready" screen includes a message indicating that the voting device is ready for the poll to be opened (e.g., "This voting device is ready for poll to be opened. Election definition found. Plugged into electricity!"). It can be seen that the "voting device ready" screen also includes a hint (e.g., "Make sure the election definition is correct and that there is report paper in the voting machine before continuing with opening the poll."). Finally, it can be seen that the "voting device ready" screen includes two selection buttons—"Don't Open-Turn Off" and "Open Poll." If the poll worker selects the "Don't Open—Turn Off" button, voting device 12 will power down. However, if the poll worker selects the "Open Poll" button, the poll will be open and, depending on the options set for the election definition, the voting device 12 may automatically print a variety of reports as are known in the art.

Figure 10B:
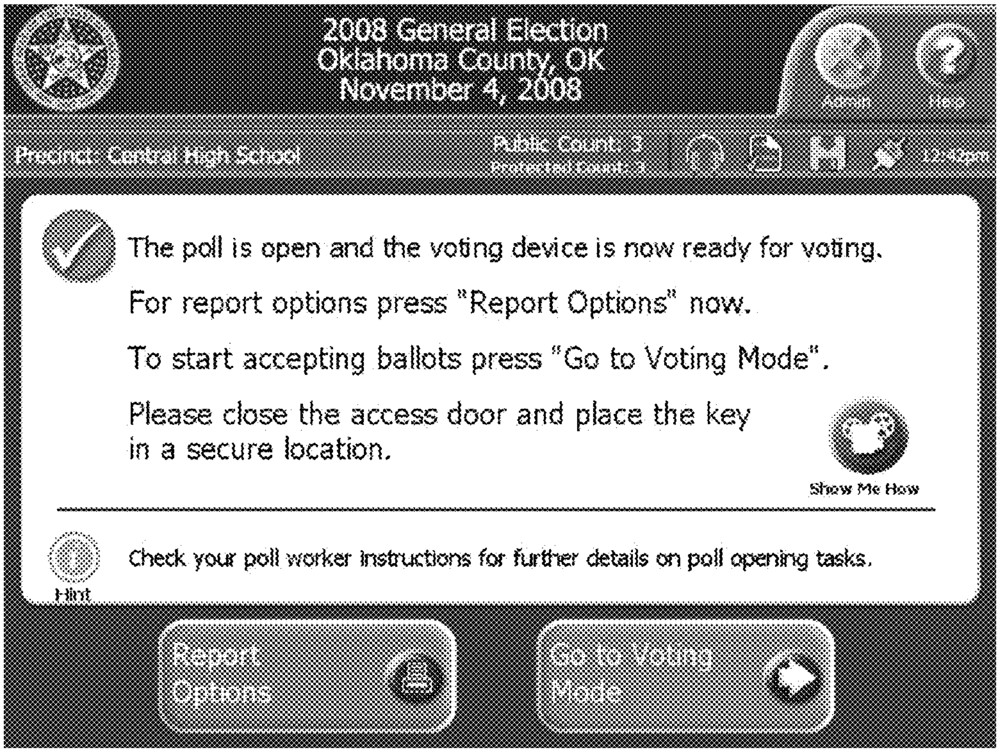

Next, voting device 12 displays a "poll open" screen on display 18 as shown in FIG. 10B. The "poll open" screen includes a message indicating that the poll is open and the voting device is ready for voting (e.g., "The poll is open and the voting device is now ready for voting. For report options press 'Report Options' now. To start accepting ballots press 'Go to Voting Mode.' Please close the access door and place the key in a secure location."). It can be seen that the "poll open" screen also includes a hint (e.g., "Check your poll worker instructions for further details on poll opening tasks."). Finally, it can be seen that the "poll open" screen includes two selection buttons—"Report Options" and "Go to Voting Mode." If the poll worker selects the "Report Options" button, a variety of different report options will be displayed. However, if the poll worker selects the "Go to Voting Mode" button, the voting device 12 will be ready for voting.

The voting device 12 is preferably capable of executing three different modes: paper ballot mode, electronic ballot mode and audio ballot mode (each of which will be described in greater detail below). A voter may choose one of these different voting options depending on voter preference. While some voters may choose to vote by marking a paper ballot, other voters may choose to vote via an electronic ballot. In addition, other voters (e.g., blind or vision-impaired voters) may choose to vote via an audio ballot. In the exemplary embodiment, the voting device 12 may operate in either the paper ballot mode or the electronic ballot mode (but not both modes concurrently). However, the audio ballot mode is executed separate and apart from the paper ballot mode and the electronic ballot mode. Therefore, at any given time, the audio ballot mode may be executed concurrently with either the paper ballot mode or the electronic ballot mode.

In order to determine if the voting device 12 is operating in the paper ballot mode or the electronic ballot mode, the voting device 12 may be programmed to detect one or more user inputs. For example, the electronic ballot mode may be activated by (i) inserting a USB device into a USB port of USB hub 70, (ii) inserting a PEB into a PEB reader/writer of PEB board 68 (described below), (iii) placing a control sheet with specific machine-readable control codes in the ballot insertion tray 16 of voting device 12, or (iv) entering a command into the touch screen display 18 of voting device 12. The paper ballot mode may be activated by (i) placing the paper ballot in the ballot insertion tray 16 of voting device 12 or (ii) entering a command into the touch screen display 18 of voting device 12. Of course, the voting device 12 may be programmed to default to either the paper ballot mode or the electronic ballot mode as desired. One skilled in the art will appreciate that the above methods for determining the mode of operation are merely examples and may be employed separately or in combination in accordance with the present invention.

Figure 10C:
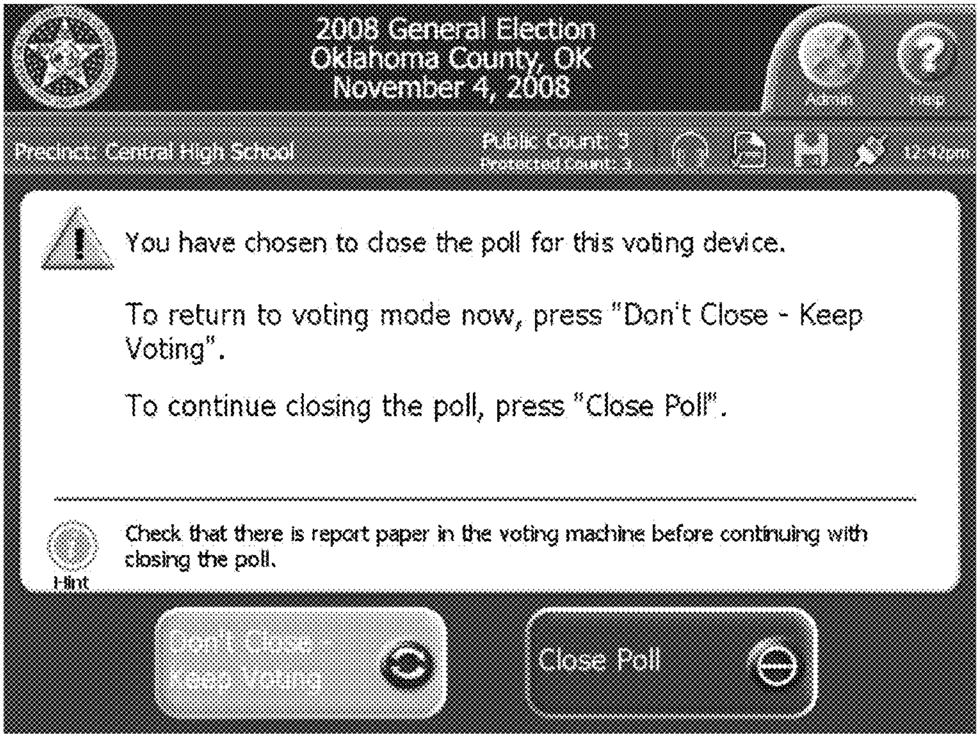

At poll closing, the poll worker depresses the "close polls" switch located on the main access board 66 of voting device 12. In response, voting device 12 displays an interim "close poll" screen on display 18 as shown in FIG. 10C. The interim "close poll" screen includes a message indicating that the poll is about to be closed (e.g., "You have chosen to close the poll for this voting device. To return to voting mode now, press 'Don't Close—Keep Voting.' To continue closing the poll, press 'Close Poll.'"). It can be seen that the interim "close poll" screen also includes a hint (e.g., "Check that there is report paper in the voting machine before continuing with closing the poll."). Finally, it can be seen that the "close poll" screen includes two selection buttons—"Don't Close-Keep Voting" and "Close Poll." If the poll worker selects the "Don't Close—Keep Voting" button, voting device 12 will continue with voting. However, if the poll worker selects the "Close Poll" button, the poll will close and, depending on the options set for the election definition, the voting device 12 may automatically print a variety of reports as are known in the art.

Figure 10D:
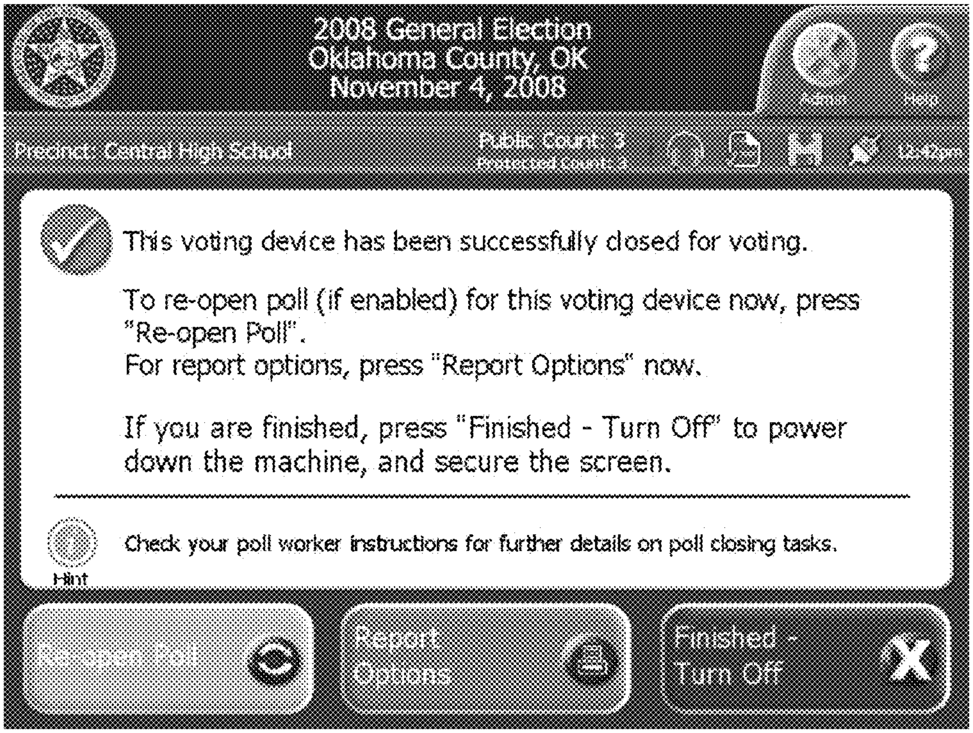

Finally, voting device 12 displays a final "poll closed" screen on display 18 as shown in FIG. 10D. The final "poll closed" screen includes a message indicating that the poll is closed for voting (e.g., "This voting device has been successfully closed for voting. To re-open poll (if enabled) for this voting device now, press 'Re-open Poll.' For report options, press 'Report Options' now. If you are finished, press 'Finished—Turn Off' to power down the machine, and secure the screen."). It can be seen that the final "poll closed" screen also includes a hint (e.g., "Check your poll worker instructions for further details on poll closing tasks."). Finally, it can be seen that the final "poll closed" screen includes three selection buttons—"Re-Open Poll," "Report Options" and "Finished—Turn Off." If the poll worker selects the "Re-Open Poll" button, the voting device 12 will go back to voting. If the poll worker selects the "Report Options" button, a variety of different report options will be displayed. However, if the poll worker selects the "Finished—Turn Off" button, the poll will be officially closed.

Of course, it can be appreciated that the accumulated vote totals for voting device 12 are transmitted to a central vote accumulation site via a landline or wireless modem, such as the modem of main access board 66. Alternatively, the accumulated vote totals for voting device 12 may be transported to the central vote accumulation site via a removable USB flash drive inserted into one of the USB ports of USB board 64.

An exemplary operation of voting device 12 in the paper ballot mode, the electronic ballot mode and the audio ballot mode will now be described in detail below. Again, it should be understood that the audio ballot mode may be executed concurrently with either the paper ballot mode or the electronic ballot mode in this exemplary embodiment.

Paper Ballot Mode

Figure 5A:
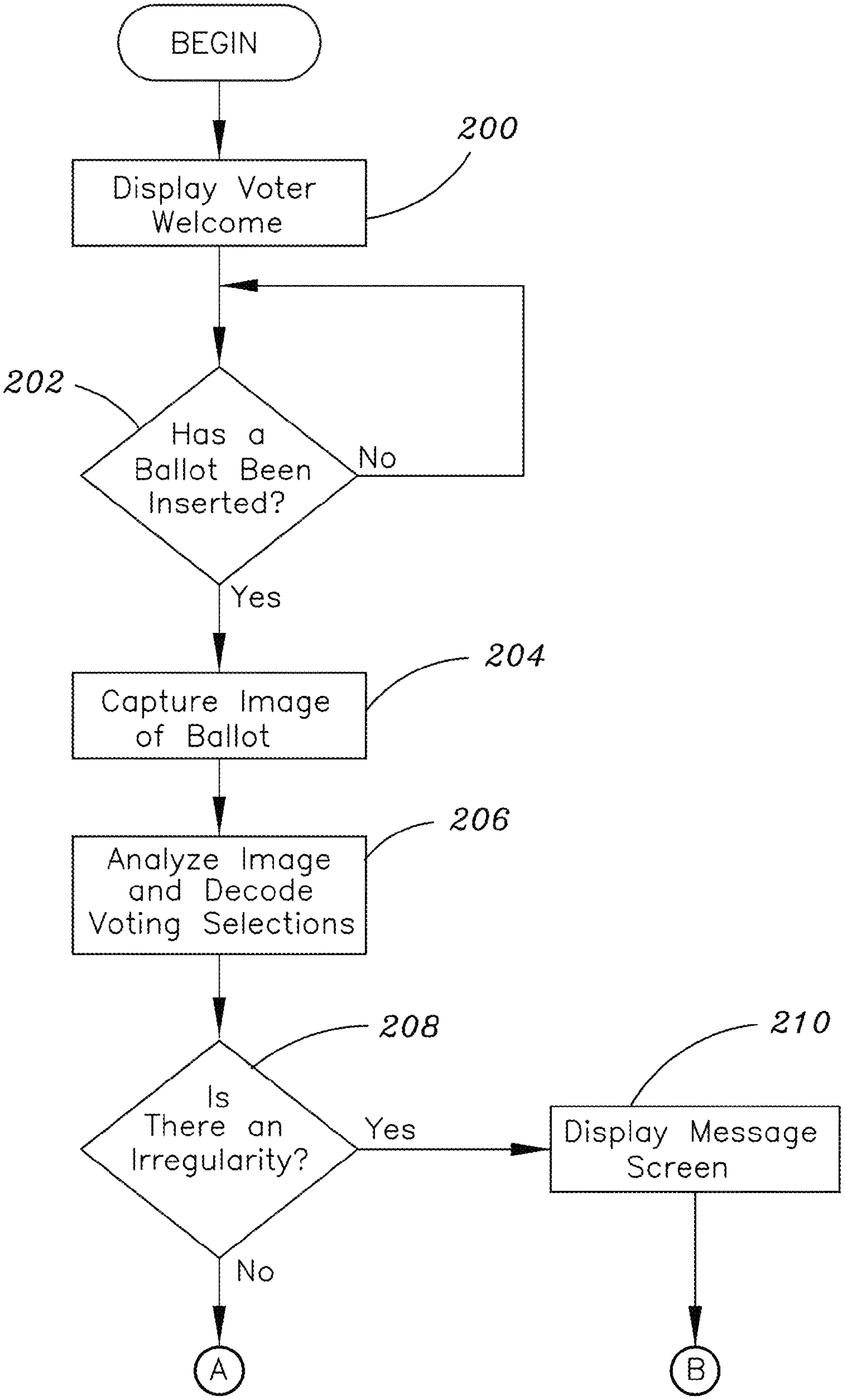
FIGS. 5A-5B are a process flow diagram of an exemplary operation of the voting system of FIG. 1 in the paper ballot mode.

An exemplary operation of the voting device 12 in the paper ballot mode will now be described with reference to blocks 200 to 222 of the process flow diagram shown in FIGS. 5A and 5B. At block 200, the voting device 12 displays a "welcome" screen on display 18 as shown in FIG. 6A. The "welcome" screen displays a message (e.g., "Welcome. Please insert your ballot.") and a graphical depiction of the voting device demonstrating the proper insertion of the ballot into the ballot insertion tray (wherein the demonstration may be either static or moving). The "welcome" screen also includes a horizontally scrollable list of available languages at the bottom of the screen. The list of languages can be customized to include the most frequently used languages for a particular precinct location. Furthermore, the "welcome" screen may be set up to offer the most frequently used languages on the display, wherein other languages are available by scrolling through the list using the scroll bar.

Figure 6A:
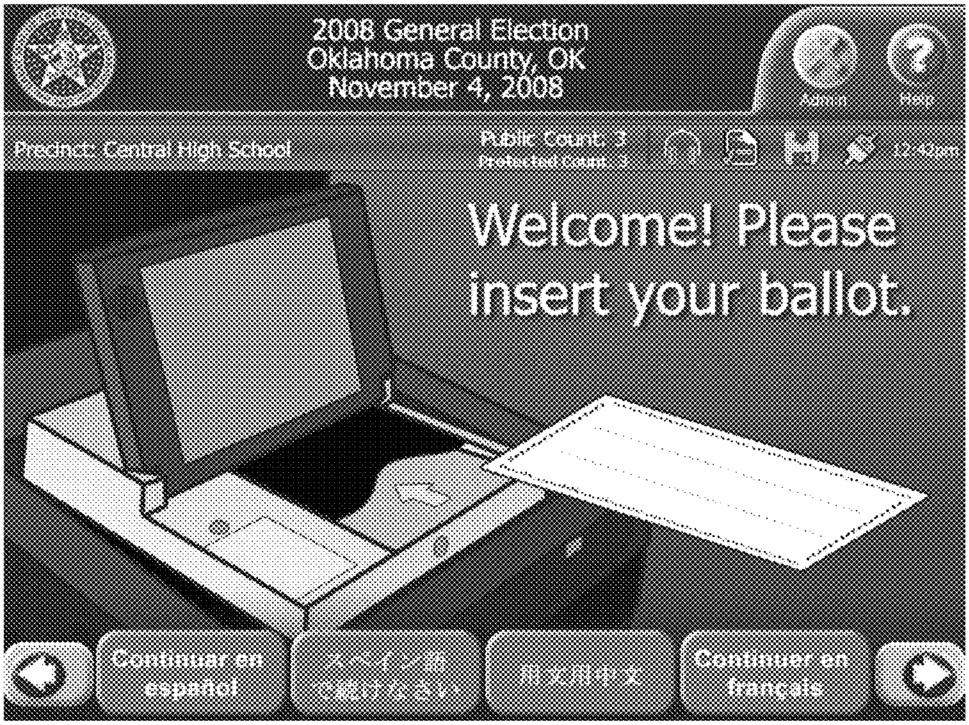
FIGS. 6A-6G are various screen shots of the display of the voting device of FIG. 1 when in the paper ballot mode.
Figure 6B:
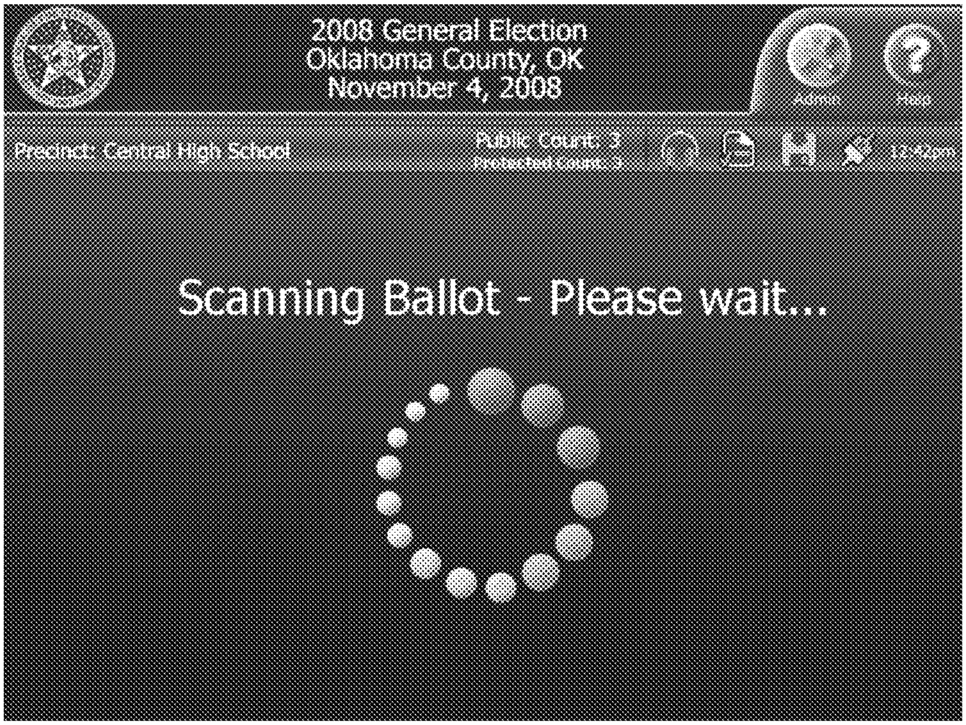

At block 202, the ballot position sensors continuously monitor whether a paper ballot has been inserted into the ballot insertion tray 16 and, upon detection of a ballot, the ballot is fed into the ballot scanner assembly 50. Upon receiving a paper ballot, the voting device 12 displays a "scanning ballot" screen on display 18 as shown in FIG. 6B, prompting the voter to wait until the voting selections marked on the ballot have been processed. Referring back to FIG. 5A, at block 204, the ballot scanner assembly 50 scans the paper ballot so as to capture an image of the ballot. For double-sided ballots, both sides of the paper ballot are preferably scanned simultaneously so as to capture an image of each side of the ballot. As discussed above, the removable USB flash drives of USB board 64 may be used to store the images of the scanned ballots, which may be accessed at a later time for audit purposes.

At block 206, the CPU board 52 analyzes the captured image of the ballot so as to decode the voting selections marked on the ballot. Preferably, the voting selections are decoded using intelligent mark recognition (IMR) technology as described in U.S. Pat. No. 6,854,644 assigned to the assignee of the present application, which is incorporated herein by reference in its entirety. The paper ballot may contain identification marks that allow the CPU board 52 to verify that the ballot is valid for a specific polling place, and, to select the proper ballot template (which is provided as part of the election definition loaded into the voting device 12 via the removable USB flash drive or PEB at poll opening) for decoding the voting selections marked on the ballot.

Figure 6C:
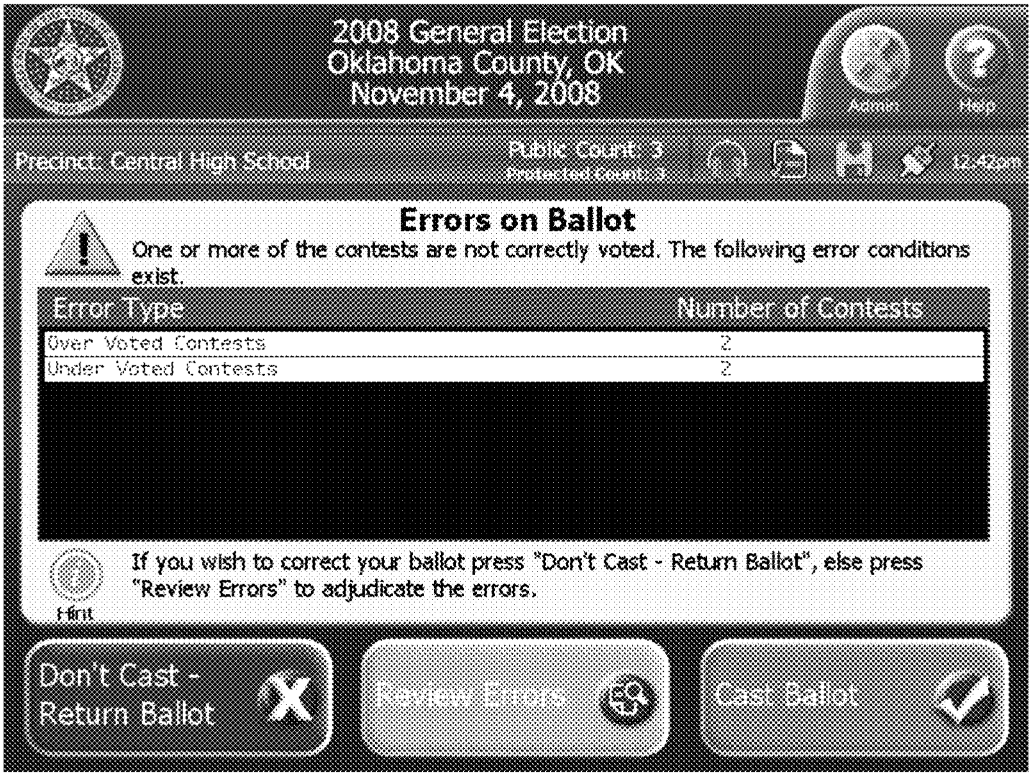

At block 208, the voting device 12 identifies any irregularities associated with the paper ballot, including scanning errors (e.g., read errors or unclear marks) and errors relating to the decoding of the voting selections marked on the ballot (e.g., over votes and under votes). At block 210, if one or more irregularities are detected, the voting device 12 displays a "ballot errors" screen on display 18 identifying the nature of the identified errors, as shown in FIG. 6C. The "ballot errors" screen provides clear feedback to the voter on the disposition of his/her paper ballot. The "ballot errors" screen displays a notification that one or more contests are not correctly voted (e.g., "One or more of the contests are not correctly voted. The following error conditions exist."), a list of encountered error types (e.g., "Over Voted Contests" and "Under Voted Contests"), and the number of contests affected with each listed error type. It can be seen that the "ballot errors" screen also includes instructions on how to proceed (e.g., "If you wish to correct your ballot press 'Don't Cast—Return Ballot', else press 'Review Errors' to adjudicate the errors."). Finally, it can be seen that the "ballot errors" screen includes three selection buttons—"Don't Cast—Return Ballot" (described below), "Review Errors," and "Cast Ballot" (described below).

Generally, by selecting one of the detected irregularities and then touching the "Review Errors" button, the voter is presented with a new screen listing the affected contests and describing the selected error type. Examples of the types of message screens that may be displayed on the display 18 of voting device 12 will now be described with reference to FIGS. 6D to 6F.

Figure 6D:
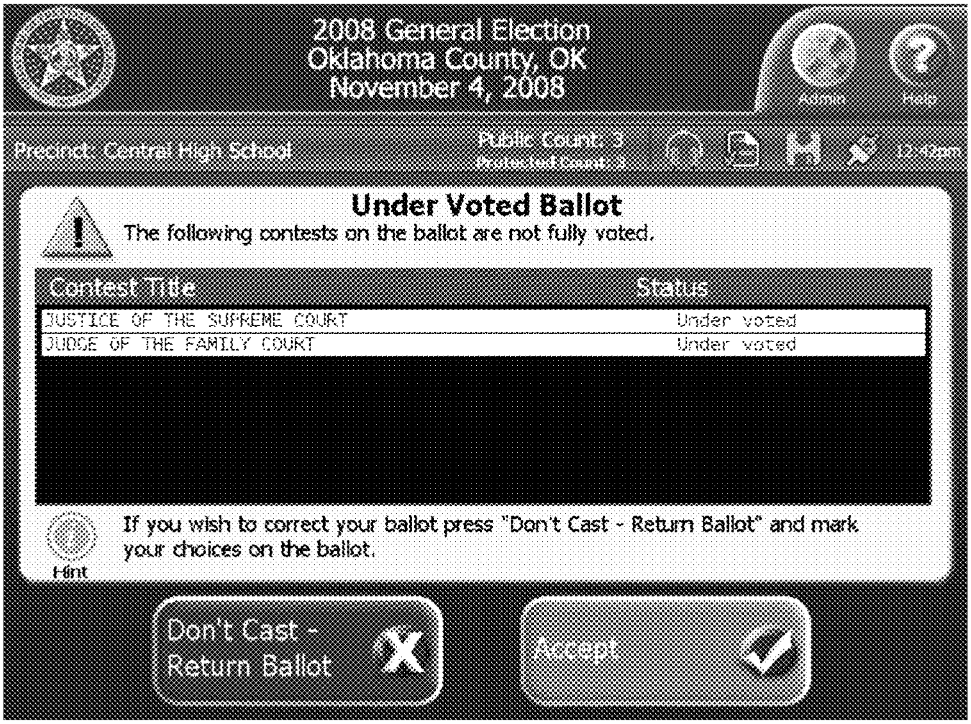

An exemplary "under-vote" screen listing the under voted contests is shown in FIG. 6D. The "under-vote" screen includes identifying information for each of the under-voted contests (e.g., the "Contest Title") and instructions for correcting the under-voted contests on the ballot (e.g., "If you wish to correct your ballot press 'Don't Cast—Return Ballot' and mark your choices on the ballot."). Finally, it can be seen that the "under-vote" screen includes two selection buttons—"Don't Cast—Return Ballot" (described below) and "Accept" (described below).

Figure 6E:
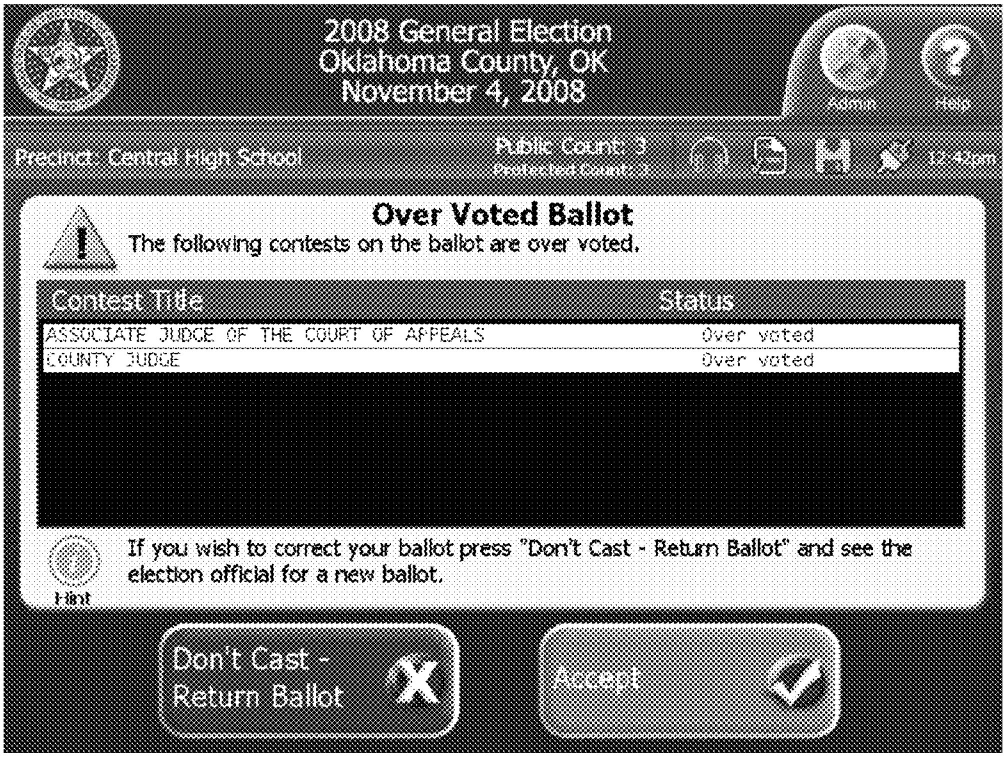

An exemplary "over-vote" screen listing the over-voted contests is depicted in FIG. 6E. The "over-vote" screen includes identifying information for each of the over-voted contests (e.g., "Contest Title") and instructions for correcting the over-voted contests on the ballot (e.g., "If you wish to correct your ballot press 'Don't Cast—Return Ballot' and see the election official for a new ballot."). Finally, it can be seen that the "over-vote" screen includes two selection buttons—"Don't Cast—Return Ballot" (described below) and "Accept" (described below).

Figure 6F:
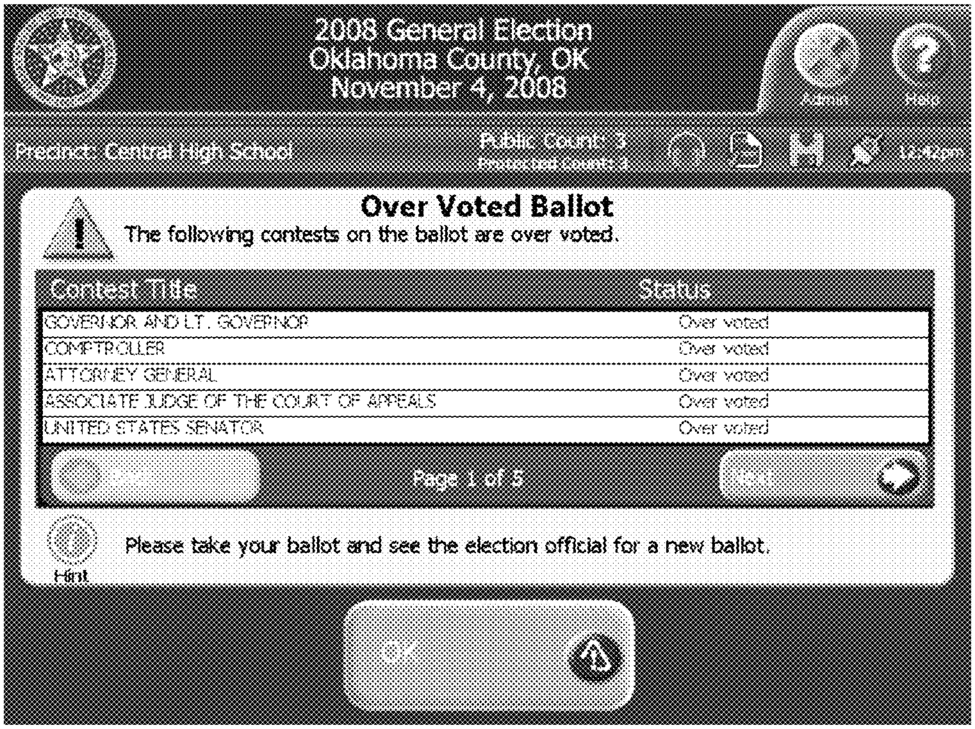

An example of an "over-vote" screen used in jurisdictions that prohibit casting over-voted ballots is depicted in FIG. 6F. It can be seen that the "over-vote" screen does not allow casting the ballot, providing only one button—"OK"—for returning the ballot to the voter. The screen shown in FIG. 6F also depicts a method for displaying a list of contests where the number of contests with irregularities exceeds the available screen space reserved for the list. The contests are distributed among a number of pages, with left-pointing and right-pointing arrows that allow scrolling through the pages.

Figure 5B:
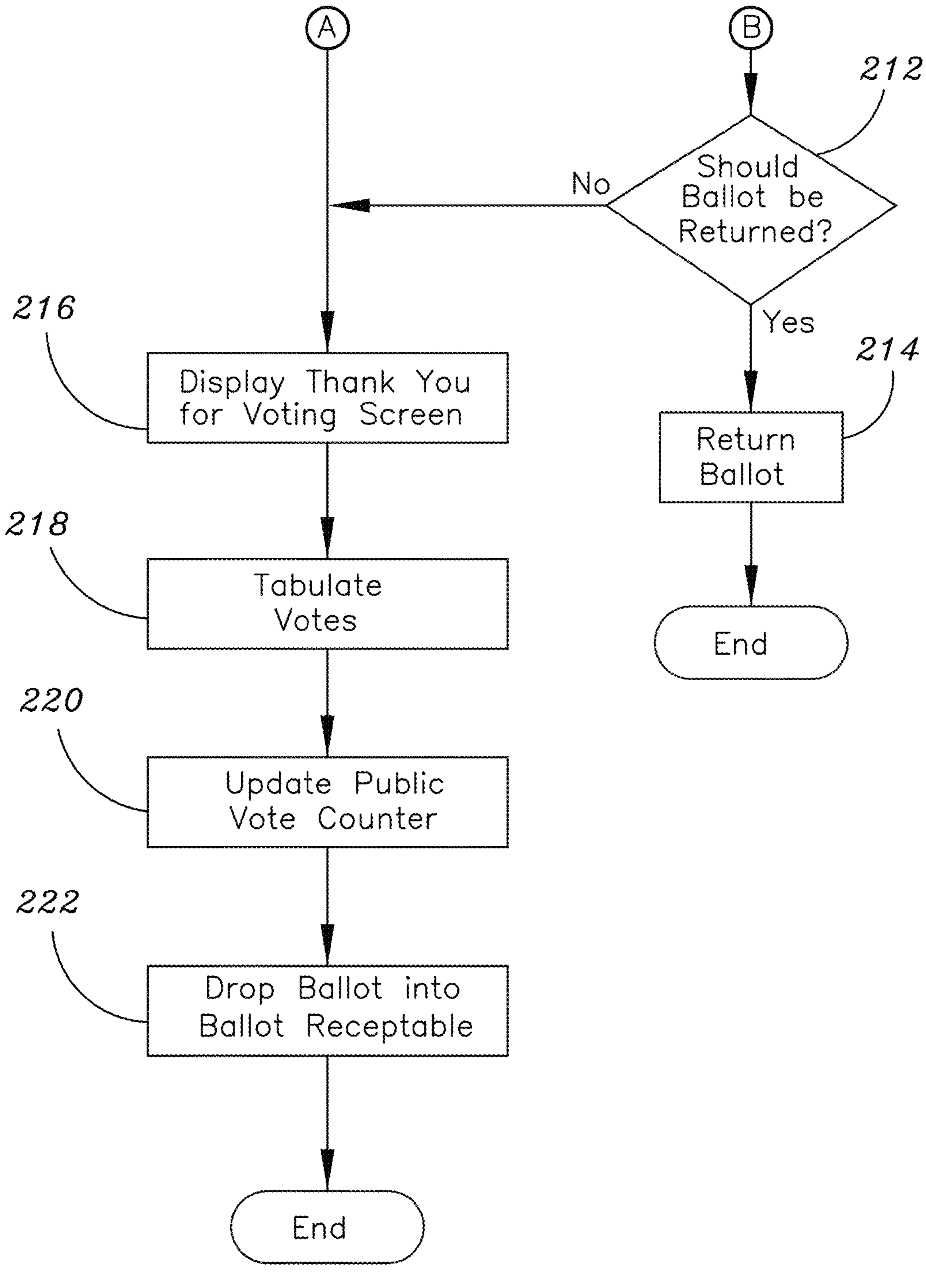

Referring to FIG. 5B, at block 212, a determination is made as to whether the paper ballot should be returned to the voter. It can be appreciated that this determination is made based upon whether the voter selects the "Don't Cast—Return Ballot" button or the "Cast Ballot/Accept" button on the screens depicted in FIGS. 6C to 6E, or, whether the error relates to the scanning of the ballot. If the voter selects the "Don't Cast—Return Ballot" button or if the error relates to the scanning of the ballot, the ballot is returned to the voter at block 214, preferably by feeding the ballot in the opposite direction through the ballot insertion tray 16. At this point, the voter may either correct the error on the same paper ballot or obtain a new ballot from a poll worker. If the voter selects the "Cast Ballot" button, the contests with irregularities (e.g., under-votes and/or over-votes) will not be included in the final tabulation while the remaining contests will be tabulated appropriately. It should be noted that the voting rules in some jurisdictions may prohibit casting ballots containing certain voting irregularities (e.g., over voted ballots). In those jurisdictions, if one or more prohibited irregularities are detected, the "Cast Ballot" button will not be displayed as an option.

Figure 6G:
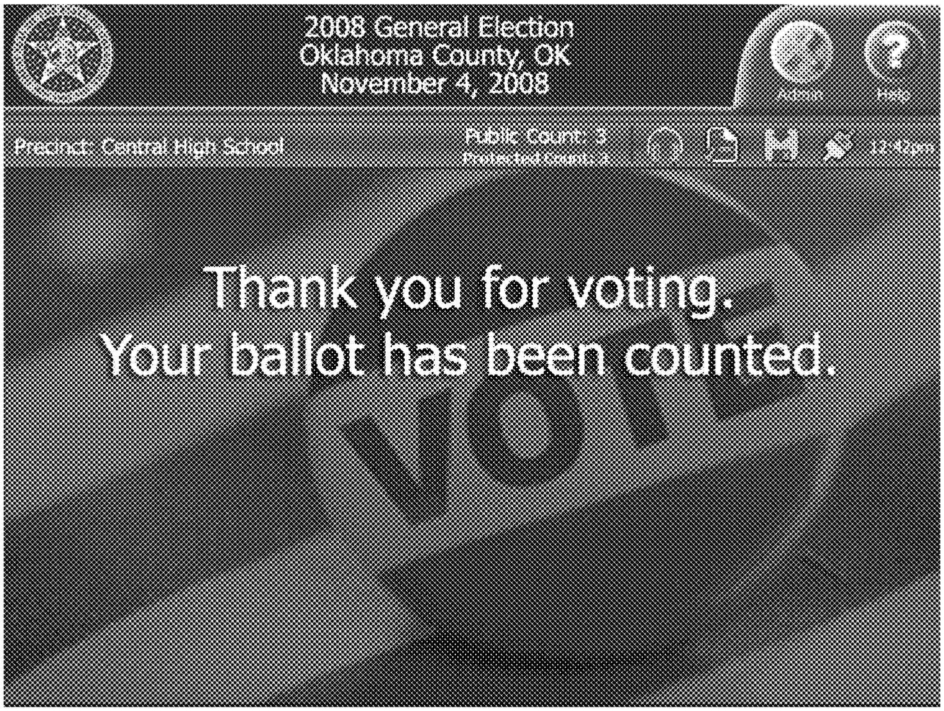

At block 216, upon casting the ballot, the voting device 12 displays a "thank you for voting" screen on the display 18 informing the voter that his/her voting selections have been tabulated. An example of such a "thank you for voting" screen is depicted in FIG. 6G. The "thank you for voting" screen displays a short message (e.g., "Thank you for voting. Your ballot has been counted."). Preferably, the message will be displayed for approximately 3 seconds or until the next ballot is inserted into the ballot insertion tray 16.

Next, at block 218 in FIG. 5B, the votes are tabulated by the CPU board 32 and stored in one of the removable USB flash drives of USB board 64 (noting, of course, that any contest with errors, such as under-votes and/or over-votes, are not tabulated). Then, at block 220, the public and protected counts (described below) are incremented by one to thereby provide confirmation that the ballot has been tabulated. At block 222, the ballot is dropped into the secure ballot receptacle 26 where it is retained for audit purposes, as is known in the art.

Finally, it should be understood that the screens shown in FIGS. 6A-6G are merely examples of the type of message screens that may be used to implement the various features of the invention. One skilled in the art will appreciate that other message screens could alternatively be used that display the information in a different format and/or that display different types of information. Of course, other types of message screens (both for use by voters and poll workers) may be used in accordance with the invention.

Electronic Ballot Mode

Figure 7A:
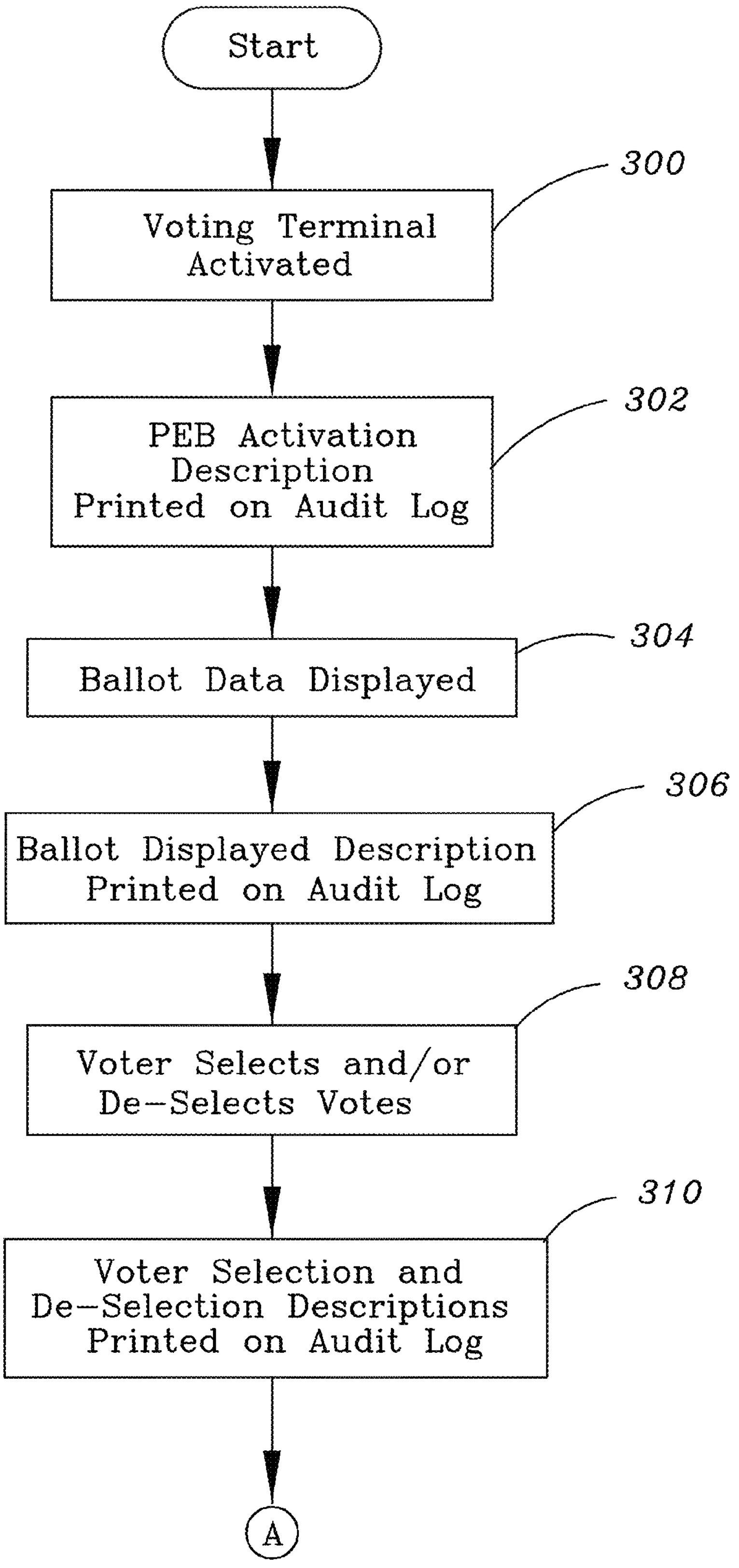
FIGS. 7A-7B are a process flow diagram of an exemplary operation of the voting system of FIG. 1 in the electronic ballot mode.

An exemplary operation of the voting device 12 in the electronic ballot mode will now be described with reference to blocks 300 to 322 of the process flow diagram shown in FIGS. 7A and 7B. At block 300, an electronic ballot voting session may be activated in a variety of different ways (as discussed above). In the exemplary embodiment, the electronic ballot voting session is activated by inserting a PEB into the PEB reader/writer of PEB board 68. Then, at block 302, audit log printer assembly 80 prints a description of the action on the audit log(e.g., "voting session activated").

It should be understood that there are two possible modes of activation for an electronic ballot voting session: poll worker activation and voter activation. In poll worker activation mode, a poll worker inserts a supervisor PEB into the PEB reader/writer, whereby the various races to be voted on are displayed on the display 18. By contrast, in voter activation mode, a poll worker activates a voter PEB at a supervisor terminal by writing an activation security code to the voter PEB. The poll worker provides the voter PEB to the voter who proceeds to the voting device 12 and inserts the voter PEB into the PEB reader/writer. The PEB reader/writer reads the activation security code from the voter PEB, whereby the various races to be voted on are displayed on the display 18. After the voter has completed the voting process, the PEB reader/writer writes a deactivation security code to the voter PEB so that the voter PEB cannot be used again for voting until it is reactivated by a poll worker at the supervisor terminal.

After the electronic ballot voting session has been activated, the voting device 12 displays the ballot data (i.e., the various races to be voted on) on display 18 at block 304. Then, at block 306, audit log printer assembly 80 prints a description of the action on the audit log (e.g., "ballot displayed"). At block 308, the voter selects his/her votes by touching the appropriate locations on the touch screen of display 18. In response, audit log printer assembly 80 prints a description of each action on the audit log at block 310 (e.g., "Governor: select candidate A"; Governor: de-select candidate A", Governor: select candidate B", etc.).

Figure 7B:
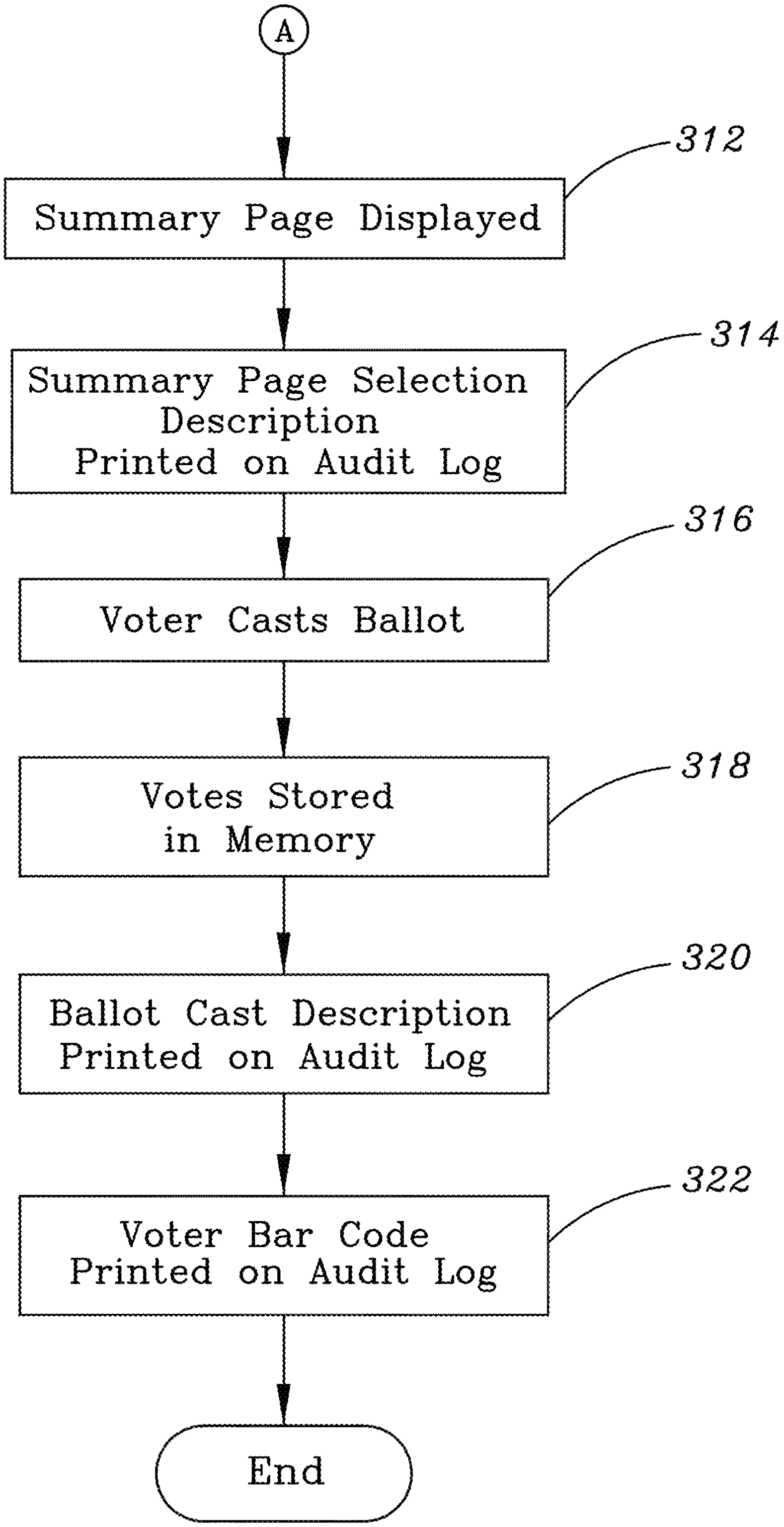

Referring to FIG. 7B, at block 312, after all of the votes have been selected, voting device 12 displays a summary page on display 18 for review by the voter (at which time the voter may change any of the selected votes). This summary page includes a summary of each of the selected candidates/referendum positions, as well as a summary of the under-voted contests. In response, audit log printer assembly 80 prints a description of the action on the audit log at block 314 (e.g., "summary page displayed"). At block 316, once the voter verifies that the summary of selected votes is correct, the voter touches a "vote" button on the touch screen of display 18. At block 318, the selected votes are stored in an internal memory of the voting device 12. In response, audit log printer assembly 80 prints a description of the action on the audit log at block 320 (e.g., "ballot cast").

In addition, at block 322, audit log printer assembly 80 also prints a voter barcode on the audit log. The voter barcode contains information corresponding to the ballot cast by the voter (e.g., the final vote selections of the voter), and is preferably printed on the audit log proximate to the printed voter actions for the voter. In the exemplary embodiment, each of the voter barcodes may be scanned by a commercially available 2D barcode reader. Thus, the scanned information from the voter barcodes may be randomly compared against the voter actions printed on the audit log for auditing purposes.

In the exemplary embodiment, audit log printer assembly 80 may optionally print a vote summary on the audit log that includes a voting device barcode. The voting device barcode may contain the serial number of the voting device 12, the total ballots cast on the voting device 12 in the electronic ballot mode, and the vote totals for each candidate and/or referendum issue within each race. Preferably, the voting device barcode is printed at the end of the audit log so that it may be easily scanned by a commercially available barcode reader for verification purposes after the election is over.

Audio Ballot Mode

Figure 8:
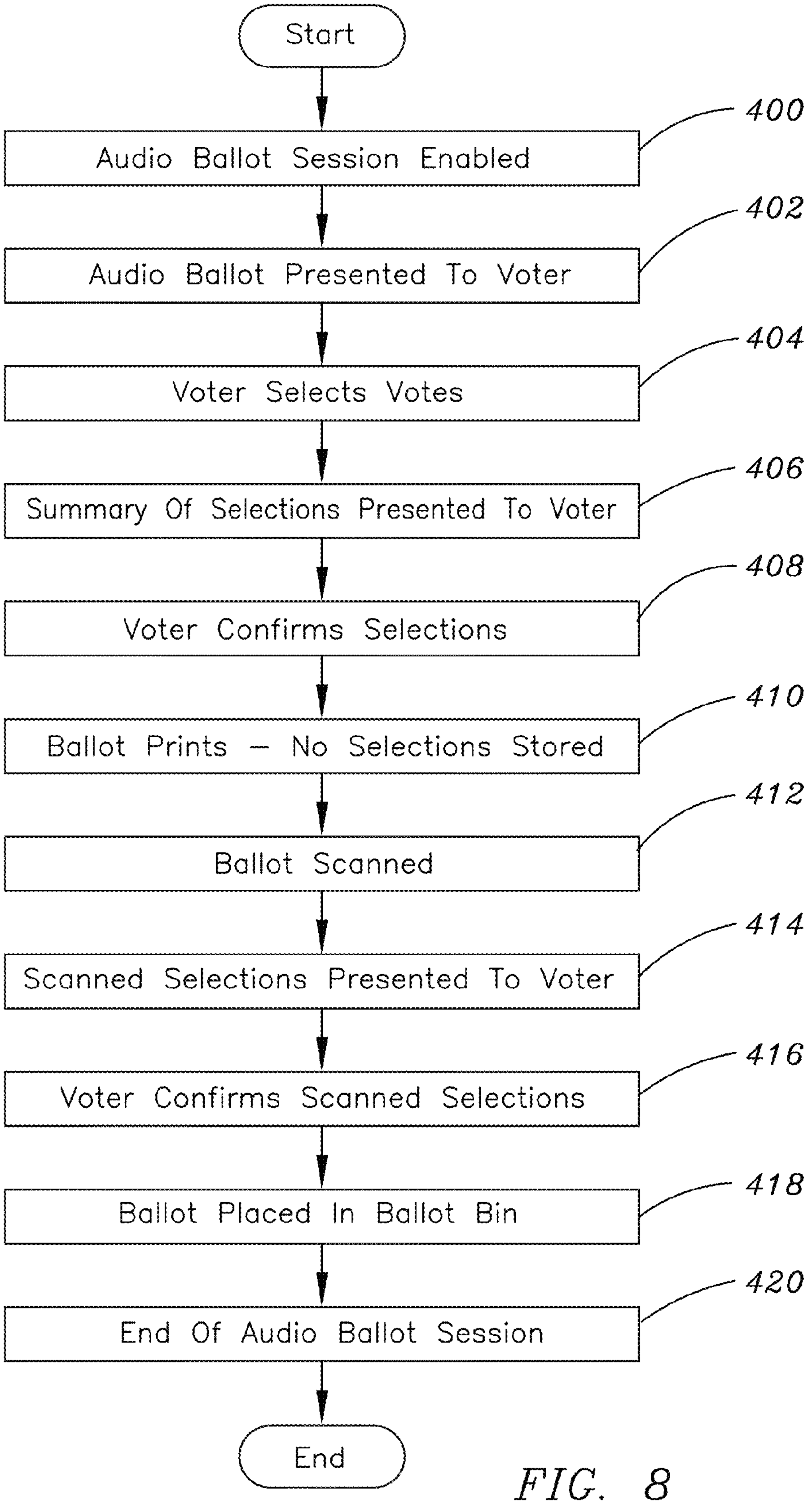
FIG. 8 is a process flow diagram of an exemplary operation of the voting system of FIG. 1 in the audio ballot mode.

An exemplary operation of the voting device 12 in the audio ballot mode will now be described with reference to blocks 400 to 420 of the process flow diagram shown in FIG. 8. At block 400, the poll worker initiates an audio ballot voting session via an administration screen displayed on the display 18 of voting device 12. An example audio ballot initiation process will be described with reference to the screen shown in FIGS. 9A to 9J.

Figure 9A:
FIGS. 9A-9M are various screen shots of the display of the voting device of FIG. 1 when in the audio ballot mode.

To access the audio ballot settings, the poll worker must select the "Admin" button located at the top right corner of each of the display screens. Upon selection of the "Admin" button, the voting device 12 displays an "enter password" screen on display 18 as shown in FIG. 9A. The "enter password" screen displays a full alphanumeric QWERTY keyboard, a text entry field for entry of an election password, an instruction line prompting the poll worker to enter the password (e.g., "Enter Election Password"), and two selection buttons—"Accept" and "Cancel." Upon entering the election password and selecting the "Accept" button, the poll worker is presented with an "administration" screen as shown in FIG. 9B.

Figure 9B:
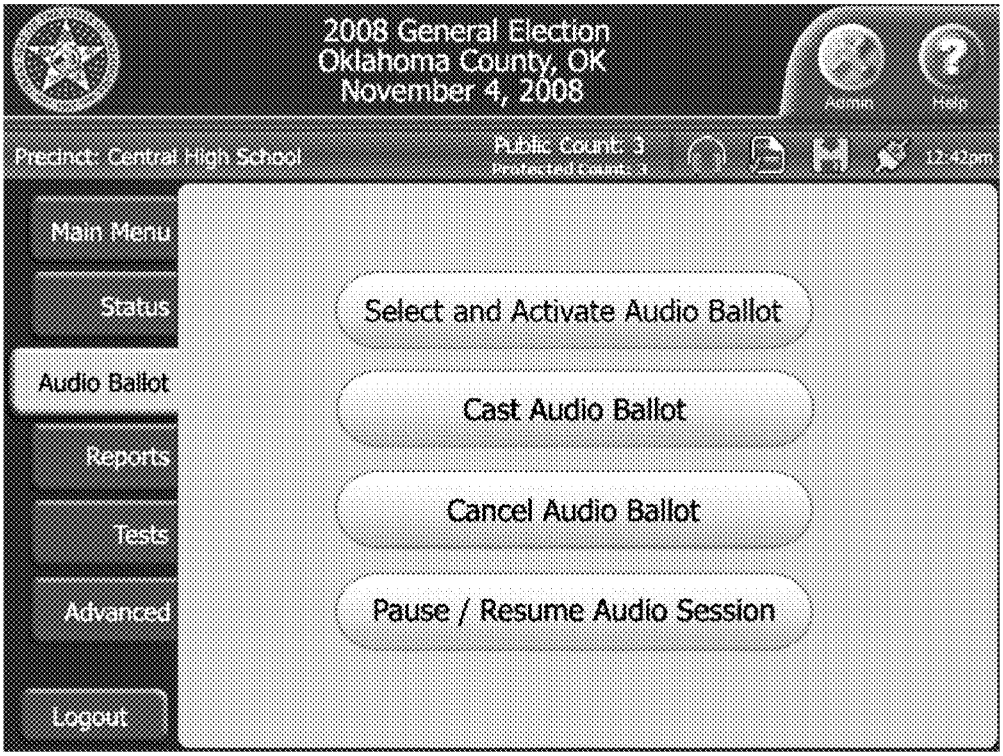

As can be seen in FIG. 9B, the "administration" screen provides functions necessary for the administration of the voting system 10. Various administrative functions are assigned to vertically aligned tabs shown at the left-hand side of the "administration" screen. The selection of each tab will cause the display of a number of related administration functions. For example, selection of the "Audio Ballot" tab causes the display of four audio ballot control functions (e.g., "Select and Activate Audio Ballot," "Cast Audio Ballot," "Cancel Audio Ballot" and "Pause/Resume Audio Session"). In order to activate an audio ballot voting session, the poll worker selects the "Select and Activate Audio Ballot" button.

Figure 9C:
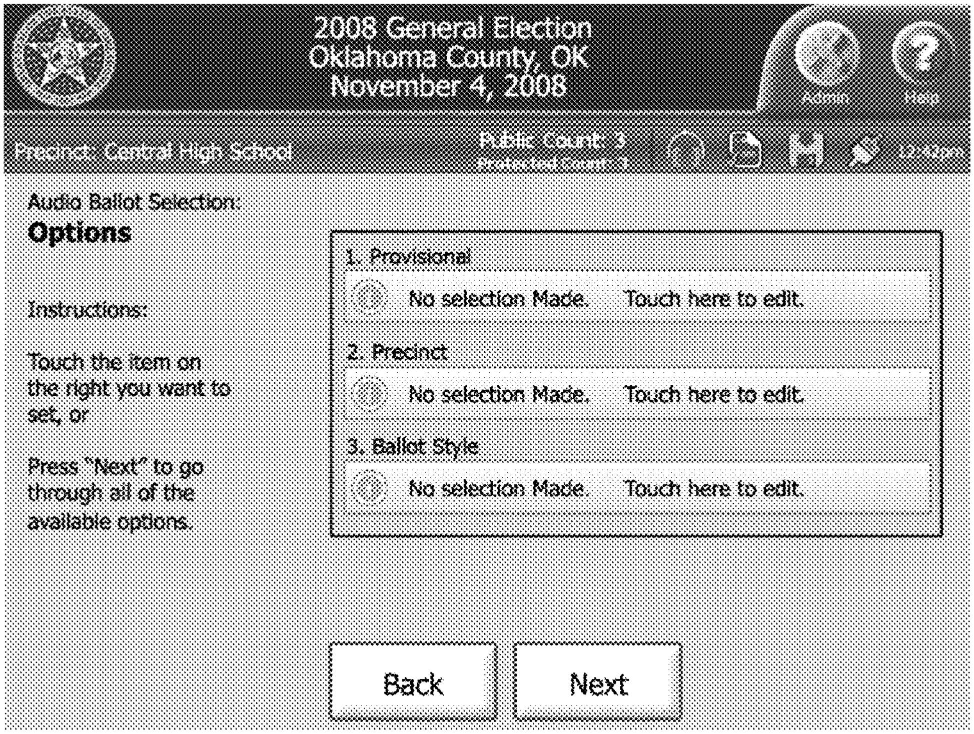

Upon selection of the "Select and Activate Audio Ballot" button, the voting device 12 displays an "audio ballot selection options" screen on display 18 as shown in FIG. 9C. The "audio ballot selection options" screen includes instructions for modifying the audio ballot settings (e.g., "Touch the item on the right you want to set, or Press 'Next' to go through all of the available options."). Three screen areas are provided for a "Provisional" ballot, "Precinct" and "Ballot Style" settings. The number and types of available settings can be defined for each precinct, with the "Ballot Style" setting being a mandatory setting. Finally, it can be seen that the "audio ballot selection options" screen includes two selection buttons—"Back" and "Next."

Figure 9D:
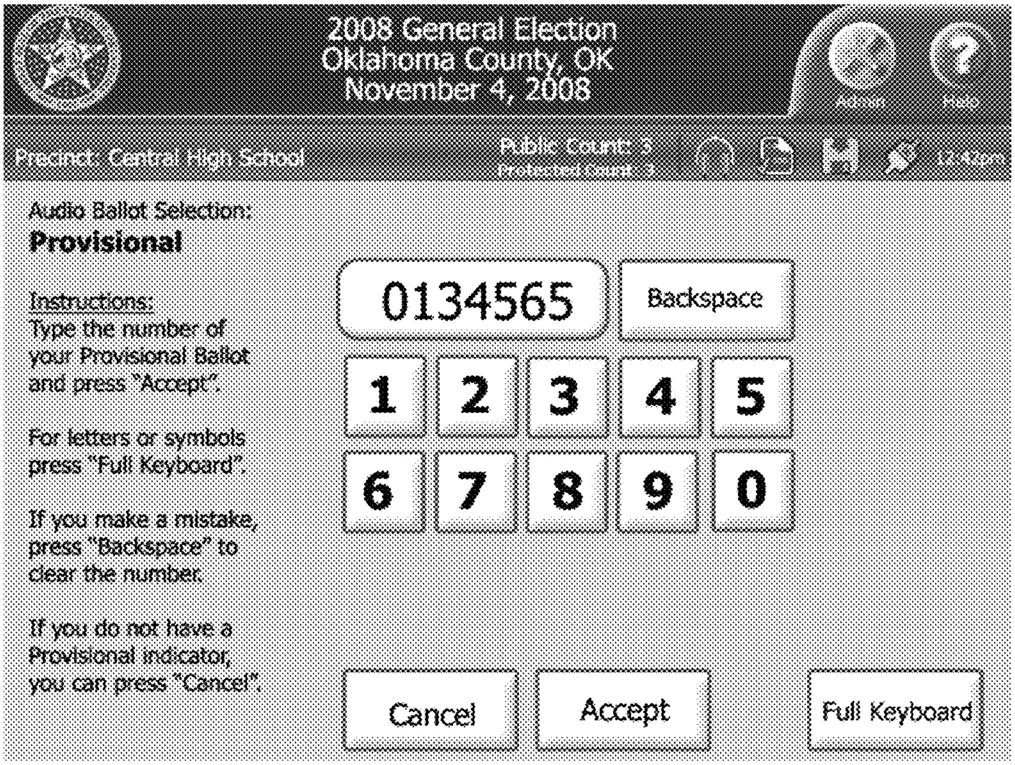

By selecting either the "Next" or "Provisional" buttons, the voting device 12 displays a "provisional audio ballot selection" screen on the display 18 as shown in FIG. 9D. The "provisional audio ballot selection" screen displays a numeric keyboard, which can be substituted by a full keyboard, for entering the number of a Provisional Ballot. The "full keyboard" button causes a full keyboard to be displayed. The "provisional audio ballot selection" screen further includes instructions on how to select a Provisional Ballot (e.g., "Type the number of your Provisional Ballot and press 'Accept'"), and two selection buttons—"Cancel" and "Accept." Upon selection of the "Accept" button, the voting device 12 stores the entered number of the Provisional Ballot.

Figure 9E:
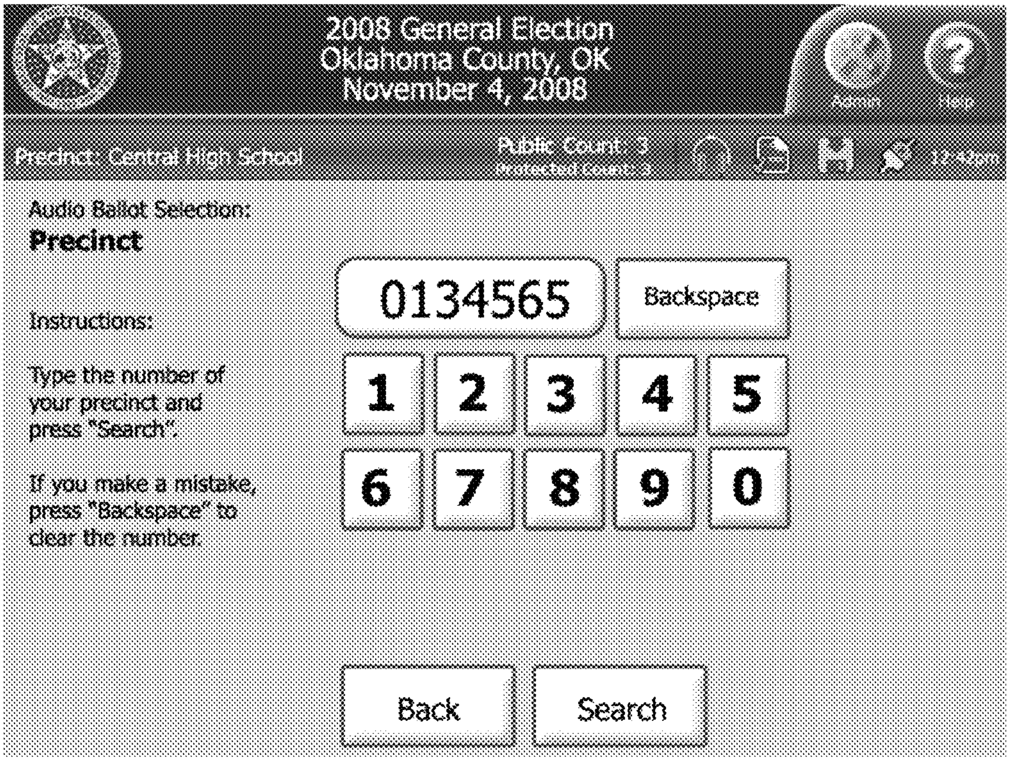

Referring back to the "audio ballot selection options" screen of FIG. 9C, if the "Precinct" button is selected, the voting device 12 displays a "precinct ballot selection" screen on the display 18 as shown in FIG. 9E. The "precinct ballot selection" screen includes a numeric keyboard for entering a precinct number, and instructions for making the selection (e.g., "Type the number of your precinct and press 'Search'. If you make a mistake, press 'Backspace' to clear the number."). It can be seen that the "precinct ballot selection" screen includes two selection buttons—"Back" and "Search."

Figure 9F:
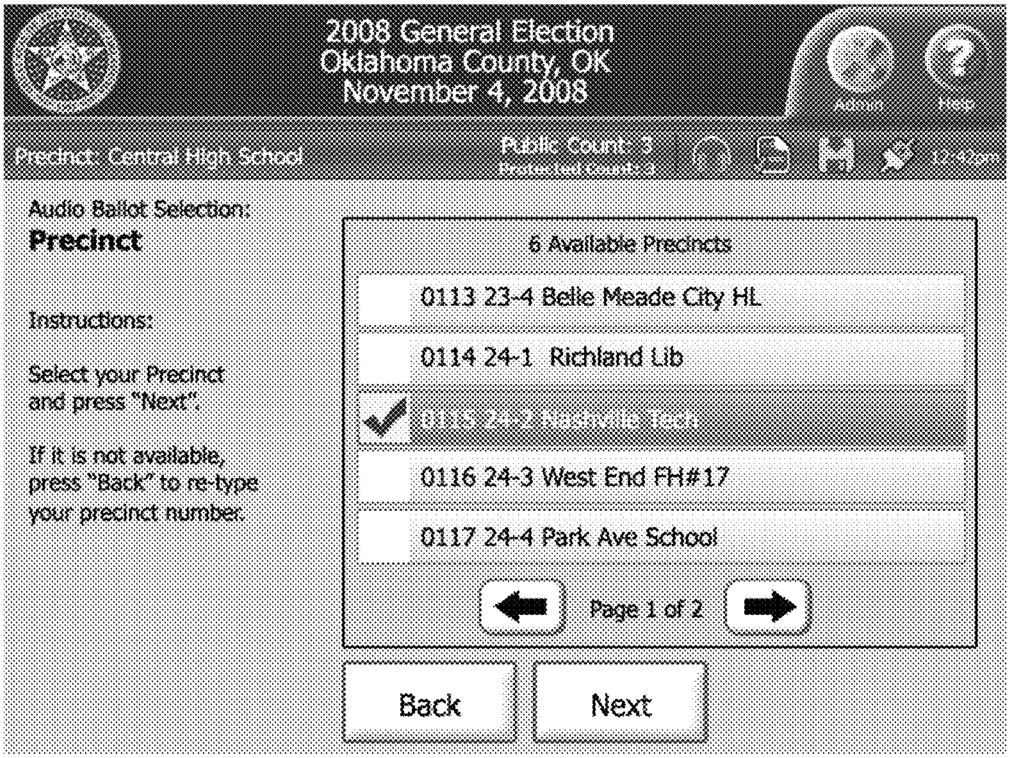
Figure 9G:

Upon selection of the "Search" button, the voting device 12 searches through a list of stored precincts to locate corresponding precinct numbers, and displays the results of the search in the "available precincts" screen shown in FIG. 9F. If the number of available precincts exceeds the allocated screen area, the precincts are divided into two or more pages wherein left-pointing and right-pointing buttons allow the poll worker to scroll through the pages. The "available precincts" screen also includes instructions for making selections (e.g., "Select your Precinct and press 'Next.' If it is not available, press 'Back' to re-type your precinct number."). Upon selection of a precinct name, a checkmark appears next to the precinct name on the screen. Finally, it can be seen that the "available precincts" screen includes two selection buttons—"Back" and "Next." If the poll worker wishes to change the search criteria, the poll worker can go back to the "precinct ballot selection" screen by selecting the "Back" button. However, if the poll worker is satisfied with the precinct selection, the poll worker can select the "Next" button.

Upon selection of the "Next" button, the voting device 12 may display a variety of different screens on display 18 depending on the type of election. For example, in a general election, the "ballot style" screen shown in FIG. 9H may be displayed (discussed below). However, in a primary election, a political party may first be selected through the "political party" screen shown in FIG. 9G. The "political party" screen displays a list of available political parties. If the number of available political parties exceeds the allocated screen area, the political parties are divided into two or more pages wherein left-pointing and right-pointing buttons allow the poll worker to scroll through the pages. The "political party" screen also includes instructions for selecting a political party (e.g., "Select a Political Party and press 'Next'."). Upon selection of a political party, a checkmark appears next to the selected political party on the screen. Finally, it can be seen that the "political party" screen includes two selection buttons—"Back" and "Next."

Figure 9H:
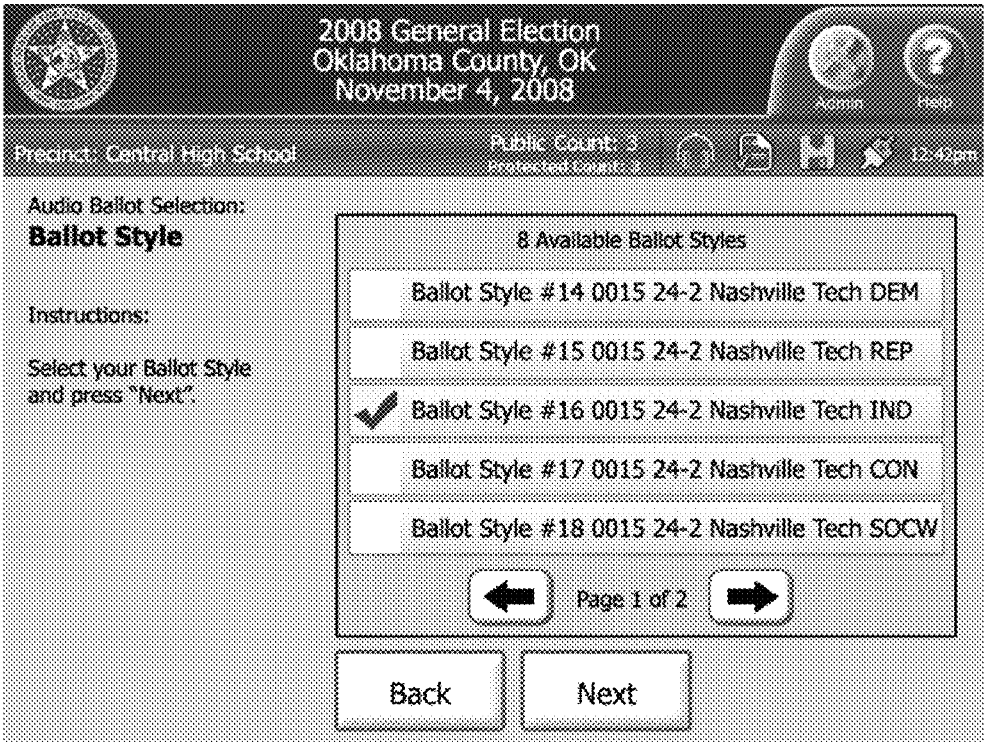

Upon selection of the "Next" button, the voting device 12 displays the "ballot style" screen on the display 18 as shown in FIG. 9H. The "ballot style" screen is used to select the ballot style for the audio ballot voting session. The "ballot style" screen displays a list of available ballot styles, which is a subset of all ballot styles loaded into the voting device 12 as part of the election definition. The subset is defined by the precinct number and/or political party selected following the selection process described above. Therefore, if no selections are made in regard to the precinct number and/or political party, the list of available ballot styles will include all ballot styles loaded into the voting device 12. On the other hand, by making selections for the precinct number and/or political party, the set of available ballot styles is limited to ballot styles with matching attributes.

On the "ballot style" screen, if the list of available ballot styles exceeds the allocated screen area, the available ballot styles are divided into two or more pages wherein left-pointing and right-pointing buttons allow the poll worker to scroll through the pages. The "political party" screen also includes instructions on how to effectuate the ballot style selection (e.g., "Select your Ballot Style and press 'Next'."). Upon selection of a ballot style, a checkmark appears next to the selected ballot style on the screen. Finally, it can be seen that the "ballot style" screen includes two selection buttons—"Back" and "Next."

Figure 9I:
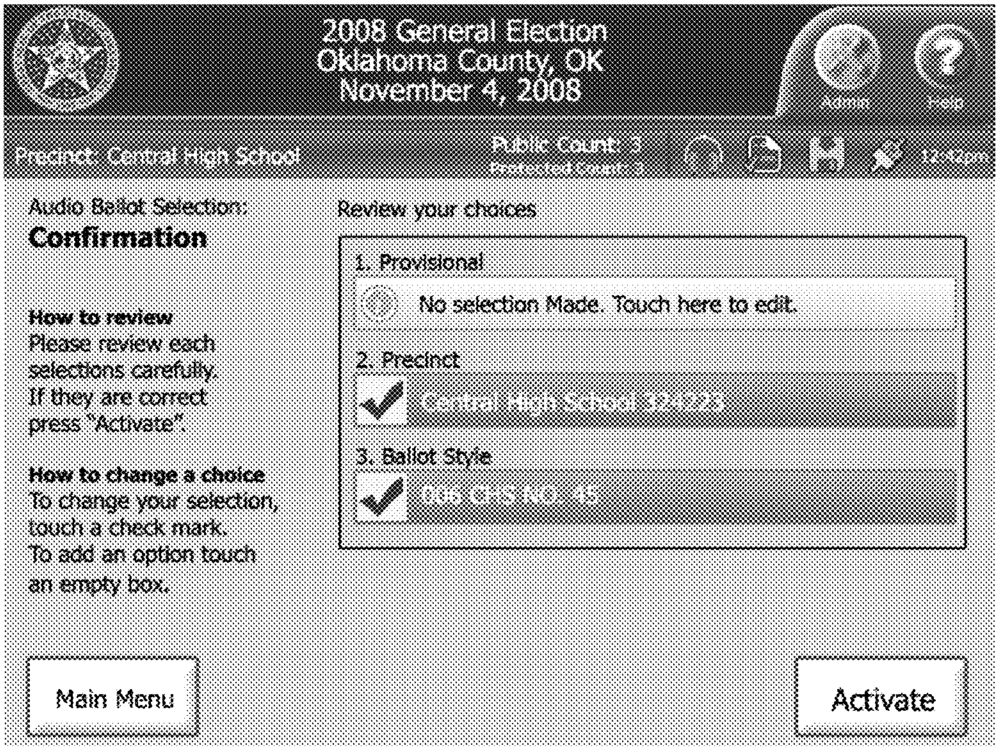
Figure 9J:
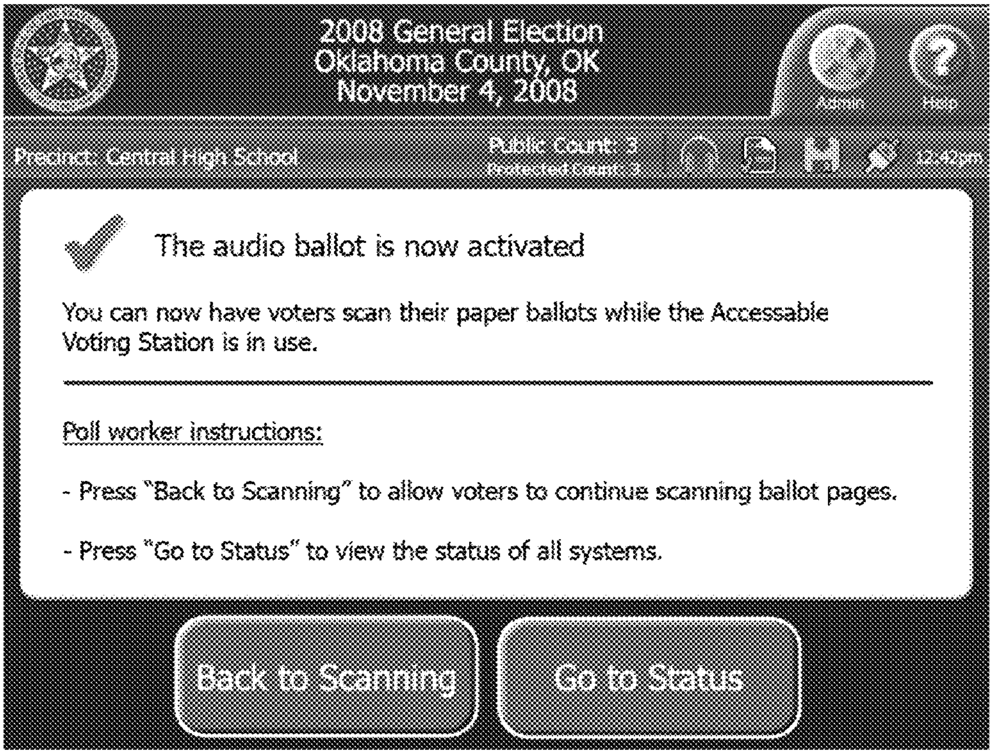

Upon selection of the "Next" button, the voting device 12 displays a "confirmation" screen on the display 18 as shown in FIG. 9I. The "confirmation" screen includes three screen areas displaying the poll worker's selection of a "Provisional" ballot number (if applicable), a "Precinct" and a "Ballot Style." The "confirmation" screen also includes instructions on how to modify the entered settings (e.g., "To change your selection touch a check mark. To add an option touch an empty box"), and instructions regarding the activation of the audio ballot voting session (e.g., "Please review each selection carefully. If they are correct press 'Activate'."). Finally, it can be seen that the "confirmation" screen includes two selection buttons—"Main Menu" and "Activate." The "Main Menu" button leads the poll worker to the "administration" screen shown in FIG. 9B, while the "Activate" button activates the audio ballot voting session and presents the voter with an "audio ballot activated" screen as shown in FIG. 9J.

The "audio ballot activated" screen displays a notification that the audio ballot has been successfully activated, and instructions regarding further options available to the poll worker. Specifically, the poll worker is notified that selecting the "Back to Scanning" button will allow the voting device 12 to continue processing paper or electronic ballots, while the "Go to Status" button will display the status of the voting device subsystems.

Referring back to FIG. 8, following activation of the audio ballot voting session, the voting device 12 presents the audio ballot to the voter at block 402. The form of the audio ballot presentation is directly related to the ballot style selection made as part of the activation process described above. Looking to the accessible voting station 100 of FIG. 3, the voter is able to listen to the audio ballot via the headphones 106. At block 404, the voter makes his/her voting selections using the voting console 104 (as described in connection with FIG. 4). A summary of the voting selections is read to the voter at block 406, whereby the voter is prompted to reject or confirm the summary. If the voter rejects the summary, the voter is allowed to repeat the voting process. If the voter confirms the summary at block 408, a ballot (described in connection with FIG. 3 above) is printed by the ballot printer at block 410. It should be noted that the voting selections are not stored in the memory of voting device 12; rather, the printed ballot is the sole record of the voter's voting selections.

At block 412, the printed ballot (which includes one or more barcodes) is scanned by the barcode reader. At block 414, the voting selection information extracted from the barcodes on the printed ballot is presented to the voter via headphones 106, and the voter is prompted to reject or confirm the scanned voting selections. If the voter rejects the scanned voting selections, the printed ballot is marked as "rejected" before being deposited into the ballot bin 128 and the voter is allowed to repeat the voting process. If the voter confirms the scanned voting selections at block 416, the ballot is marked as "accepted" and deposited into the ballot bin 128 at block 418. The audio ballot voting session then ends at block 420.

Figure 9K:
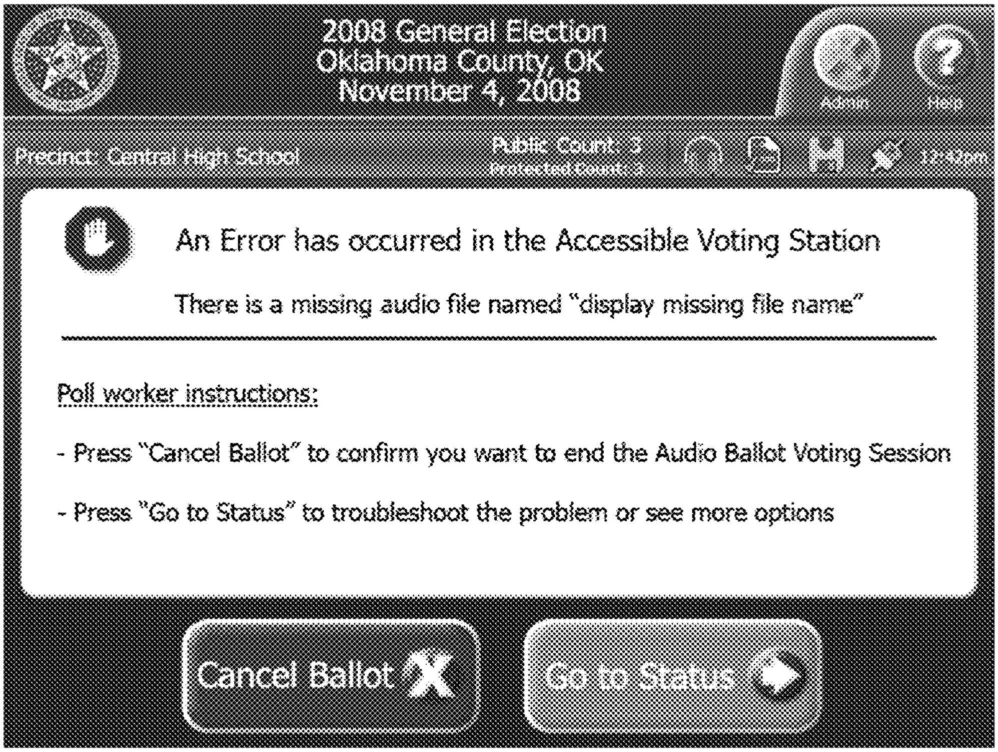

If the voting device 12 detects an error condition during the audio ballot voting session, the poll worker is notified via an "accessible voting station status" headphones icon displayed directly below the "Admin" button on each of the screens. The "accessible voting station status" headphones icon is represented by different colors to indicate the status of the audio ballot voting session. Specifically, orange indicates that the audio ballot voting session is inactive, green indicates that the audio ballot voting session is active, yellow indicates that there is an issue with the audio ballot voting session, and red indicates that there is a critical error with the audio ballot voting session. In case of a critical error, a pop-up window also appears on the display 18 which requires the poll worker's immediate attention. Preferably, the poll worker enters the administration screens by selecting the "Admin" button and providing the election password, as described with reference to FIG. 9A. An exemplary "error" screen is shown in FIG. 9K. The "error" screen includes a notification as to the source and the cause of the error (e.g., "An Error has occurred in the Accessible Voting Station. There is a missing audio file named 'PlsMkS1'.") In addition, the "error" screen provided detailed instructions to the poll worker (e.g., "Press 'Cancel Ballot' to confirm you want to end the Audio Ballot Voting Session" and "Press 'Go to Status' to troubleshoot the problem or see more options"). The "error" screen also includes two selection buttons—"Cancel Ballot" and "Go to Status" for receiving the poll worker's further commands.

The poll worker can check the status of the voting device subsystems by selecting the "Go to Status" button. Selecting the "Cancel Ballot" button ends the audio ballot voting session and causes the "audio ballot voting session successfully ended" screen shown in FIG. 9M to be displayed on display 18. The "audio ballot voting session successfully ended" screen displays a message confirming the successful termination of the audio ballot voting session (e.g., "You have successfully ended an Audio Ballot Voting Session"). The screen also includes two selection buttons—"Back to Scanning" and "Go to Status"—and provides detailed instructions regarding these selection buttons (e.g., "Press 'Back to Scanning' to allow voters to continue scanning ballot pages" and "Press 'Go to Status' to view the status of all systems").

Figure 9L:
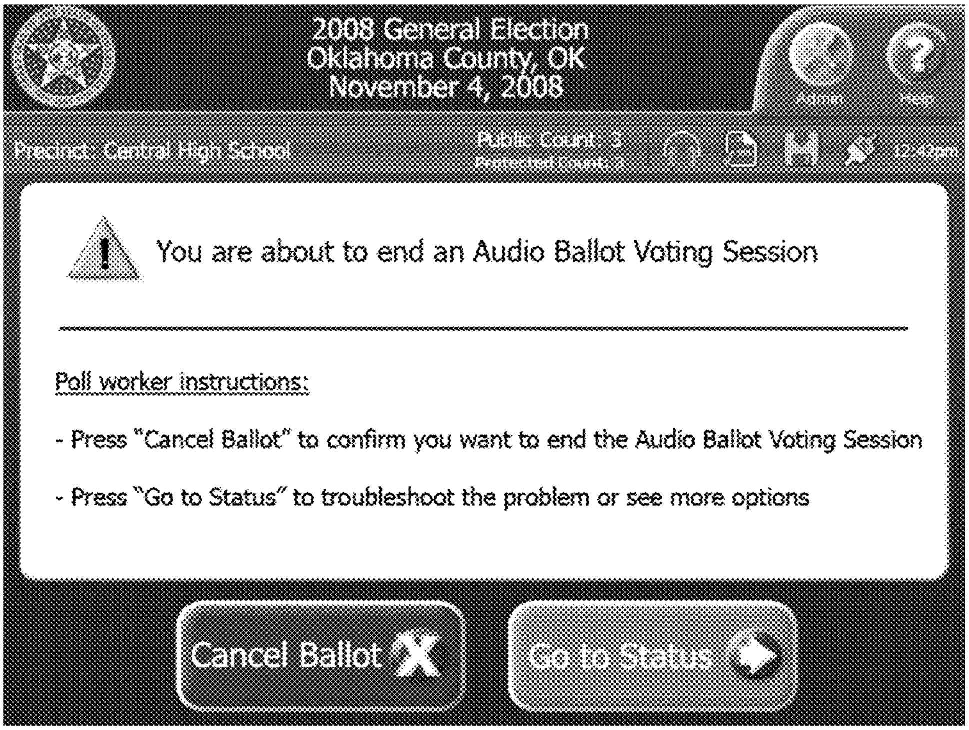
Figure 9M:
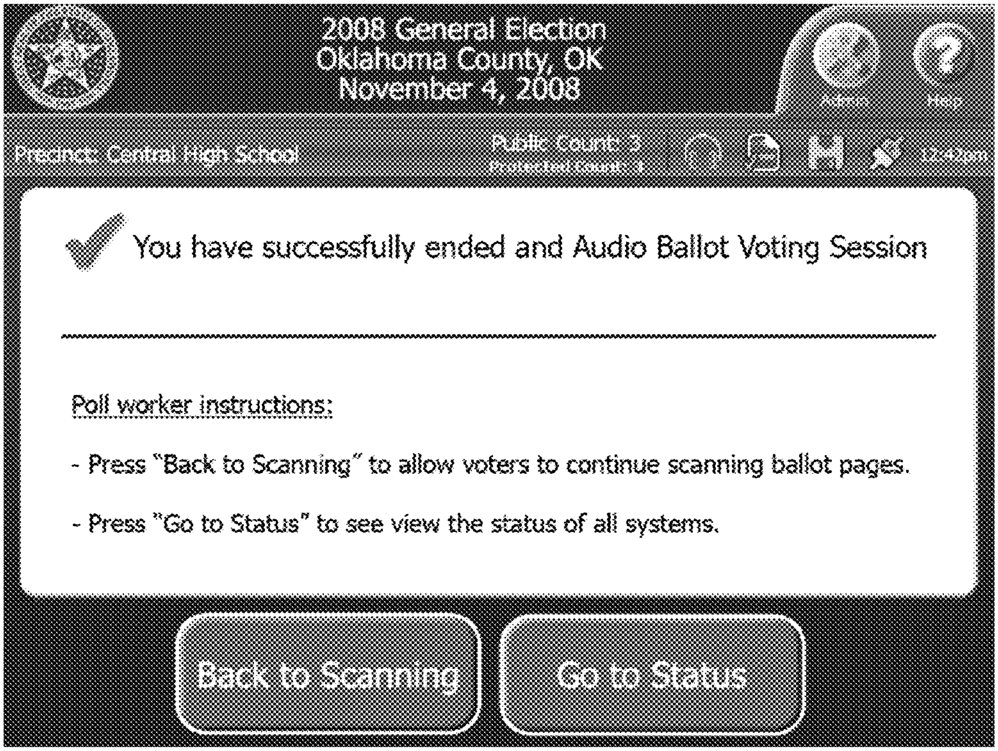

In the event that the poll worker needs to end a normally executing audio ballot voting session, he/she may select the "Cancel Audio Ballot" button associated with the "Audio Ballot" tab shown in FIG. 9B. Upon selecting the "Cancel Audio Ballot" button, the poll worker will be presented with a "confirmation" screen as shown in FIG. 9L. The "confirmation" screen includes a notification to the poll worker that the audio ballot voting session is about to end (e.g., "You are about to end an Audio Ballot Voting Session"), and provides detailed instructions on the available selections (e.g., "Press 'Cancel Ballot' to confirm you want to end the Audio Ballot Voting Session" and "Press 'Go to Status' to troubleshoot the problem or see more options"). The "confirmation" screen also includes two selection buttons—"Cancel Ballot" and "Go to Status." The poll worker can check the status of the voting device subsystems by selecting the "Go to Status" button, or end the audio ballot voting session by selecting the "Cancel Ballot" button. Selecting the "Cancel Ballot" button ends the audio ballot voting session and causes the "audio ballot voting session successfully ended" screen shown in FIG. 9M to be displayed on display 18 (described above).

Referring back to FIGS. 1 and 3, it should be noted that all of the printed ballots deposited in ballot bin 128 of the accessible voting station 100 will be collected by a poll worker periodically during the election day or at the end of the election day. The poll worker then proceeds to the voting device 12 and inserts the printed ballots one-by-one into the ballot insertion tray 16 for scanning and tabulation. Of course, it can be appreciated that the voting device 12 will include a barcode reader (not shown) operable to read the printed ballots.

It should be understood that alternative methods for processing the audio ballots are possible and within the scope of the present invention. In one alternative embodiment, the voting selection information extracted from the barcodes on the printed ballot at block 412 of FIG. 8 is transmitted over USB cable 132*b* to the voting device 12 for tabulation. As such, the printed ballots deposited in ballot bin 128 need not be scanned a second time by voting device 12.

In another alternative embodiment, the printed ballot is provided to the voter (rather than deposited in ballot bin 128), whereby the voter inserts the ballot into the ballot insertion tray of voting device 12 for scanning and tabulation. In another alternative embodiment, the ballot bin 128 includes a display window that allows the voter to view at least a portion of the printed ballot.

In yet another alternative embodiment, the barcode reader (s) could be replaced with an optical character recognition (OCR) scanner capable of extracting information from the human-readable information printed on the ballot (in which case the printed ballot need not include the barcodes). Of course, a wide variety of other ballot formats and configurations are within the scope of the present invention, including a printed ballot that has the appearance of a traditional paper ballot.

It should be noted that all of the screens described above (as shown in FIGS. 6A-6G, 9A-9M and 10A-10D) display the same header information, including general information on the election (e.g., "2008 General Election; Oklahoma County, Okla.; Nov. 4, 2008"), a precinct identifier (e.g., "Precinct: Central High School"), a protected count consisting of a total number of ballots cast on that voting device over the entire life of the device (e.g., "Protected Count: 3"), and a public count consisting of a running total of the number of ballots cast on that voting device during a particular election (e.g., "Public Count: 3").

Furthermore, all of the screens have an "Admin" button (described above) and a "Help" button located in the upper-right corner of the screen. Upon the selection of the "Help" button, a pop-up window is displayed which is designed to provide more detailed information regarding the particular operation of the voting device 12. For example, a pop-up window that may be displayed during poll opening would list the steps required to open the poll for voting.

All of the screens also include four system indicator icons displayed directly below the "Admin" and "Help" buttons. These icons are non-selectable and are used primarily by poll workers and other non-voter users. The system indicator icons comprise, from left to right, an "accessible voting station status" headphones icon (described above), an "election definition found" icon (which will include a small red "X" if the election definition is not found), an "additional ballot image storage found" icon (which will include a small red "X" if additional ballot image storage is not found), and a "running on AC power" icon. The "running on AC power" icon will be replaced with a "battery" icon when the voting device 12 is running on battery power. This "battery" icon will preferably be displayed in five states representing the available capacity of the battery—100%, 75%, 50%, 25% and 0%. The "battery" icon may flash when the battery capacity drops below a predetermined level.

While the present invention has been described and illustrated hereinabove with reference to an exemplary embodiment, it should be understood that various modifications could be made to this embodiment without departing from the scope of the invention. In addition, it should be understood that the exemplary embodiment embodies different inventive features. One inventive feature is the provision of a voting system and method that accommodates both paper ballots and electronic ballots, and another inventive feature is the provision of a voting system and method that both accommodates both paper ballots and audio ballots. One skilled in the art will appreciate that either of these inventive features could be implemented without the other (i.e., the invention is not limited to the accommodation of all three types of ballots—paper ballots, electronic ballots and audio ballots). Therefore, the present invention is not to be limited to the specific configuration or methodology of the exemplary embodiment, except insofar as such limitations are included in the following claims.

What is claimed and desired to be secured by Letters Patent is as follows:

1. An accessible voting station for use in an election, comprising:
- a voting console operable to present an audio ballot to a voter and receive one or more voting selections entered in response to the audio ballot from the voter;
- a printer operable to print a ballot that includes the entered voting selections;
- a reader operable to scan at least a portion of the printed ballot to determine the voting selections printed thereon; and
- wherein the voting console is further operable to present an audio representation of the scanned voting selections to the voter and receive a confirmation of the audio representation of the scanned voting selections from the voter, wherein the voting selections scanned from the printed ballot and confirmed by the voter are used to cast the scanned voting selections in the election.

2. The accessible voting station of claim 1, wherein the ballot comprises a printable medium on which is printed the names of the voting selections in association with at least one barcode.

3. The accessible voting station of claim 2, wherein the reader is operable to read the at least one barcode to determine the voting selections printed on the ballot.

4. The accessible voting station of claim 2, wherein a plurality of barcodes are printed on the printable medium to correspond with the names of the voting selections.

5. The accessible voting station of claim 4, wherein the reader is operable to read each of the barcodes to determine the voting selections printed on the ballot.

6. The accessible voting station of claim 1, wherein the accessible voting station further comprises a ballot bin for collecting the printed ballot.

7. The accessible voting station of claim 6, wherein the voter is not able to view the printed ballot in the ballot bin.

8. The accessible voting station of claim 6, wherein the ballot bin includes a display window that enables the voter to view at least a portion of the printed ballot.

9. The accessible voting station of claim 6, wherein the voting console is operable to electronically transmit the scanned voting selections to a voting device for tabulation.

10. The accessible voting station of claim 6, wherein the printed ballot is retrieved by a poll worker from the ballot bin for insertion into a voting device for tabulation.

11. The accessible voting station of claim 1, wherein the printed ballot is provided to the voter for insertion into a voting device for tabulation.

12. The accessible voting station of claim 1, wherein the voting selections are printed in human-readable form on the ballot.

13. The accessible voting station of claim 12, wherein the reader is operable to read the ballot using optical character recognition to determine the voting selections printed on the ballot.

14. The accessible voting station of claim 1, wherein the voting console includes a pair of headphones for presenting the audio ballot to the voter.

15. The accessible voting station of claim 1, wherein the voting console includes an input device for receiving the voting selections entered in response to the audio ballot from the voter.

16. The accessible voting station of claim 15, wherein the input device is selected from the following group: a plurality of buttons, a sip and puff straw, paddles, and combinations thereof.

17. A voting system for use in an election, comprising:
- an accessible voting station operable to: present an audio ballot to a voter and receive one or more voting selections entered in response to the audio ballot from the voter; print a ballot that includes the entered voting selections; scan at least a portion of the printed ballot to determine the voting selections printed thereon; and present an audio representation of the scanned voting selections to the voter and receive a confirmation of the audio representation of the scanned voting selections from the voter; and
- a tabulation device operable to use the voting selections scanned from the printed ballot and confirmed by the voter to cast the scanned voting selections in the election.

18. The voting system of claim 17, wherein the ballot comprises a printable medium on which is printed the names of the voting selections in association with at least one barcode.

19. The voting system of claim 18, wherein the accessible voting station is operable to read the at least one barcode to determine the voting selections printed on the ballot.

20. The voting system of claim 18, wherein a plurality of barcodes are printed on the printable medium to correspond with the names of the voting selections.

21. The voting system of claim 20, wherein the accessible voting station is operable to read each of the barcodes to determine the voting selections printed on the ballot.

22. The voting system of claim 17, wherein the accessible voting station collects the printed ballot in a ballot bin.

23. The voting system of claim 22, wherein the voter is not able to view the printed ballot in the ballot bin.

24. The voting system of claim 22, wherein the ballot bin includes a display window that enables the voter to view at least a portion of the printed ballot.

25. The voting system of claim 22, wherein the accessible voting station is operable to electronically transmit the scanned voting selections to the tabulation device for tabulation.

26. The voting system of claim 22, wherein the printed ballot is retrieved by a poll worker from the ballot bin for insertion into the tabulation device for tabulation.

27. The voting system of claim 17, wherein the printed ballot is provided to the voter for insertion into the tabulation device for tabulation.

28. The voting system of claim 17, wherein the voting selections are printed in human-readable form on the ballot.

29. The voting system of claim 28, wherein the accessible voting station is operable to read the ballot using optical character recognition to determine the voting selections printed on the ballot.

30. The voting system of claim 17, wherein the accessible voting station includes a pair of headphones for presenting the audio ballot to the voter.

31. The voting system of claim 17, wherein the accessible voting station includes an input device for receiving the voting selections entered in response to the audio ballot from the voter.

32. The voting system of claim 31, wherein the input device is selected from the following group: a plurality of buttons, a sip and puff straw, paddles, and combinations thereof.

33. The voting system of claim 17, wherein the tabulation device is operable to: receive the printed ballot; scan at least a portion of the ballot to determine the voting selections printed thereon; and tabulate the scanned voting selections.

34. The voting system of claim 33, wherein the ballot comprises a printable medium on which is printed the names of the voting selections in association with at least one barcode.

35. The voting system of claim 34, wherein the tabulation device is operable to read the at least one barcode to determine the voting selections printed on the ballot.

36. The voting system of claim 34, wherein a plurality of barcodes are printed on the printable medium to correspond with the names of the voting selections.

37. The voting system of claim 36, wherein the tabulation device is operable to read each of the barcodes to determine the voting selections printed on the ballot.

38. The voting system of claim 33, wherein the voting selections are printed in human-readable form on the ballot.

39. The voting system of claim 38, wherein the tabulation device is operable to read the ballot using optical character recognition to determine the voting selections printed on the ballot.

40. A method of voting in an election, comprising:

using an accessible voting station to: (a) present an audio ballot to a voter; (b) receive one or more voting selections entered in response to the audio ballot from the voter; (c) print a ballot that includes the entered voting selections; (d) scan at least a portion of the printed ballot to determine the voting selections printed thereon; (e) present an audio representation of the scanned voting selections to the voter; and (f) receive a confirmation of the audio representation of the scanned voting selections from the voter; and using a tabulation device to use the voting selections scanned from the printed ballot and confirmed by the voter to cast the scanned voting selections in the election.

41. The method of claim 40, wherein the ballot comprises a printable medium on which is printed the names of the voting selections in association with at least one barcode.

42. The method of claim 41, wherein step (d) comprises reading the at least one barcode to determine the voting selections printed on the ballot.

43. The method of claim 41, wherein a plurality of barcodes are printed on the printable medium to correspond with the names of the voting selections.

44. The method of claim 43, wherein step (d) comprises reading each of the barcodes to determine the voting selections printed on the ballot.

45. The method of claim 40, further comprising providing the ballot printed by the accessible voting station to the voter for insertion into the tabulation device.

46. The method of claim 40, further comprising using the accessible voting station to: (g) deposit the printed ballot in a ballot box.

47. The method of claim 46, further comprising collecting the printed ballot from the ballot box of the accessible voting station for insertion into the tabulation device.

48. The method of claim 46, further comprising using the accessible voting station to: (h) electronically transmit the scanned voting selections to the tabulation device.

49. The method of claim 40, wherein the voting selections are printed in human-readable form on the ballot.

50. The method of claim 49, wherein step (d) comprises reading the ballot using optical character recognition to determine the voting selections printed on the ballot.

51. The method of claim 40, further comprising using the tabulation device to: (x) receive the printed ballot; (y) scan at least a portion of the ballot to determine the voting selections printed thereon; and (z) tabulate the scanned voting selections.

52. The method of claim 51, wherein the ballot comprises a printable medium on which is printed the names of the voting selections in association with at least one barcode.

53. The method of claim 52, wherein step (y) comprises reading the at least one barcode to determine the voting selections printed on the ballot.

54. The method of claim 52, wherein a plurality of barcodes are printed on the printable medium to correspond with the names of the voting selections.

55. The method of claim 54, wherein step (y) comprises reading each of the barcodes to determine the voting selections printed on the ballot.

56. The method of claim 51, wherein the voting selections are printed in human-readable form on the ballot.

57. The method of claim 56, wherein step (y) comprises reading the ballot using optical character recognition to determine the voting selections printed on the ballot.

* * * * *